US012702966B2

(12) United States Patent
Khunsupat et al.

(10) Patent No.: US 12,702,966 B2
(45) Date of Patent: Aug. 11, 2026

(54) SUPPORTED POLY(ALLYL)AMINE AND DERIVATIVES FOR $CO_2$ CAPTURE FROM FLUE GAS OR ULTRA-DILUTE GAS STREAMS SUCH AS AMBIENT AIR OR ADMIXTURES THEREOF

(71) Applicant: Georgia Tech Research Corporation, Atlanta, GA (US)

(72) Inventors: Ratayakorn Khunsupat, Smyrna, GA (US); Christopher W. Jones, Atlanta, GA (US); Sumit Bali, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/376,245

(22) Filed: Oct. 3, 2023

(65) Prior Publication Data

US 2024/0024849 A1 Jan. 25, 2024

Related U.S. Application Data

(62) Division of application No. 17/373,759, filed on Jul. 12, 2021, now Pat. No. 11,850,570, which is a (Continued)

(51) Int. Cl.

*B01J 20/26* (2006.01)
*B01D 53/02* (2006.01)

(Continued)

(52) U.S. Cl.

CPC ............ *B01J 20/262* (2013.01); *B01D 53/02* (2013.01); *B01D 53/62* (2013.01); *B01J 20/08* (2013.01);

(Continued)

(58) Field of Classification Search

None

See application file for complete search history.

(56) References Cited

U.S. PATENT DOCUMENTS 3,466,138 A 9/1969 Spiegler
3,491,031 A 1/1970 Stoneburner (Continued)

FOREIGN PATENT DOCUMENTS

CA 2622204 A3 3/2007
CA 2622204 C 10/2016

(Continued)

OTHER PUBLICATIONS

International Search Report and Written Opinion, PCT/US2020/61690, mailed Mar. 24, 2021.

(Continued)

*Primary Examiner* — Daniel Berns

(74) *Attorney, Agent, or Firm* — Wolf, Greenfield & Sacks, P.C.

(57) ABSTRACT

Supported amine polymer adsorbents based on polymers containing only or primarily primary amines sites are to be used as regenerable adsorbents for $CO_2$ capture from ultra-dilute gas streams, such as ambient air, or from mixtures of gases containing preferably at least 10% oxygen. and can also be useful for use at the moderate gas pressures found in typical post-combustion capture processes, such as flue gas from large point sources such as coal-fired power plants. Preferred supported solid amine adsorbents of this invention are based on poly(allylamine) ("PAA") and poly(vinyl amine) ("PVAm"), both of which are linear polymers, and their derivatives, containing substantially all primary amine groups, supported on substrates. Preferred such substrates include silica mesocellular foam (MCF) and mesoporous-.gamma.-alumina, as well on mesoporous-.gamma.-alumina coated throughout the pores of MCF, most preferably of (Continued)

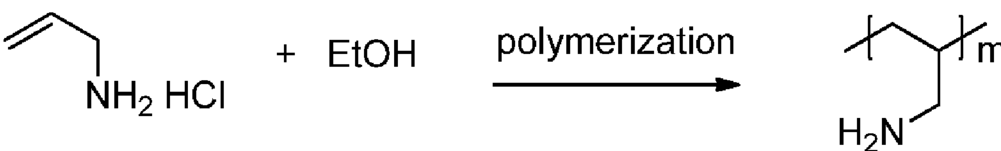

Poly(allylamine)

Polymerization to Poly(allylamine)

monolithic structure. Preferred derivatives include the guanidinylated and cross-linked poly(allylamine) materials.

5 Claims, 10 Drawing Sheets

Related U.S. Application Data division of application No. 14/063,850, filed on Oct. 25, 2013, now Pat. No. 11,059,024.

(60) Provisional application No. 61/718,267, filed on Oct. 25, 2012.

(51) Int. Cl.
*B01D 53/62* (2006.01)
*B01J 20/08* (2006.01)
*B01J 20/10* (2006.01)
*B01J 20/28* (2006.01)
*B01J 20/32* (2006.01)

(52) U.S. Cl.
CPC ....... *B01J 20/103* (2013.01); *B01J 20/28042* (2013.01); *B01J 20/28083* (2013.01); *B01J 20/3204* (2013.01); *B01J 20/3272* (2013.01); *B01J 20/3282* (2013.01); *B01D 2253/202* (2013.01); *B01D 2253/25* (2013.01); *B01D 2257/504* (2013.01); *B01D 2258/0283* (2013.01); *Y02A 50/20* (2018.01); *Y02C 20/40* (2020.08)

(56) References Cited

U.S. PATENT DOCUMENTS 3,659,401 A 5/1972 Giammarco
3,725,387 A 4/1973 McClendon
3,865,924 A 2/1975 Gidaspow
3,880,981 A 4/1975 Garingarao
3,948,627 A 4/1976 Schwarz
4,047,894 A 9/1977 Kuhl
4,152,217 A 5/1979 Eisenberg
4,197,421 A 4/1980 Steinberg
4,239,515 A 12/1980 Yanagioka
4,243,613 A 1/1981 Brockhaus
4,285,918 A 8/1981 Gustafson
4,455,153 A 6/1984 Jakahi
4,472,178 A 9/1984 Kumar
4,497,641 A 2/1985 Brown, Jr.
4,528,248 A 7/1985 Galbraith
4,579,723 A 4/1986 Weltmer
4,711,645 A 12/1987 Kumar
4,762,528 A 8/1988 Reichl
4,808,317 A 2/1989 Berry
4,810,266 A 3/1989 Zinnen
4,822,383 A 4/1989 Brose
5,061,455 A 10/1991 Brose
5,087,597 A 2/1992 Leal
5,364,887 A 11/1994 Konig
5,367,147 A 11/1994 Kim et al.
5,376,614 A 12/1994 Birbara
5,424,051 A 6/1995 Nagji
5,443,804 A 8/1995 Parker
5,492,683 A 2/1996 Birbara
5,520,894 A 5/1996 Heesink
5,593,475 A 1/1997 Minh
5,595,239 A 1/1997 Wolf
5,635,142 A 6/1997 Ichiki
5,642,630 A 7/1997 Abdelmalek
5,653,785 A 8/1997 Horio
5,871,646 A 2/1999 Jones
5,876,488 A 3/1999 Birbara
5,879,432 A 3/1999 Morlec
5,906,806 A 5/1999 Clark
5,928,806 A 7/1999 Olah
5,958,353 A 9/1999 Eyal
6,004,381 A 12/1999 Rohrbach
6,048,509 A 4/2000 Kawai
6,090,186 A 7/2000 Spencer
6,106,595 A 8/2000 Spencer
6,117,404 A 9/2000 Mimura
6,174,506 B1 1/2001 Chakravarti
6,250,298 B1 6/2001 Gonda
6,292,680 B1 9/2001 Somogyi
6,364,938 B1 4/2002 Birbara
6,387,337 B1 5/2002 Pennline
6,500,236 B2 12/2002 Suzuki
6,540,936 B1 4/2003 Takagi
6,547,854 B1 4/2003 Gray
6,612,485 B2 9/2003 Lackner
6,790,430 B1 9/2004 Lackner
6,797,039 B2 9/2004 Spencer
6,800,331 B2 10/2004 Bilyk
6,873,267 B1 3/2005 Tubel
6,890,497 B2 5/2005 Rau
6,908,497 B1 6/2005 Sirwardane
6,960,242 B2 11/2005 Leitch
7,128,777 B2 10/2006 Spencer
7,132,090 B2 11/2006 Dziedzic
7,141,859 B2 11/2006 DeBoer
7,288,136 B1 10/2007 Gray
7,385,012 B2 6/2008 Chang
7,452,406 B2 11/2008 Little
7,584,171 B2 9/2009 Guan
7,655,069 B2 2/2010 Wright
7,658,994 B2 2/2010 Lakshmi
7,666,250 B1 2/2010 Blencoe
7,699,909 B2 4/2010 Lackner
7,708,806 B2 5/2010 Wright
7,795,175 B2 9/2010 Olah
7,799,310 B2 9/2010 Lackner
7,827,778 B2 11/2010 Finkenrath
7,833,328 B2 11/2010 Lackner
7,909,911 B2 3/2011 Lackner
7,947,239 B2 5/2011 Lackner
7,976,897 B2 7/2011 Bhat
7,988,766 B2 8/2011 White
7,993,432 B2 8/2011 Wright
8,043,594 B2 10/2011 Lackner
8,052,776 B2 11/2011 Jiang
8,083,836 B2 12/2011 Wright
8,088,197 B2 1/2012 Wright
8,118,914 B2 2/2012 Liu
8,123,842 B2 2/2012 Pan
8,133,305 B2 3/2012 Lackner
8,163,066 B2 4/2012 Eisenberger
8,491,705 B2 7/2013 Choi
8,500,855 B2 8/2013 Eisenberger
8,500,857 B2 8/2013 Eisenberger
8,500,859 B2 8/2013 Eisenberger
8,500,860 B2 8/2013 Eisenberger
8,529,664 B2 9/2013 Deckman
8,598,071 B1 12/2013 Baugh et al.
8,696,801 B2 4/2014 Eisenberger
8,850,861 B2 10/2014 Friedrichs
8,894,747 B2 11/2014 Eisenberger
9,028,592 B2 5/2015 Eisenberger
9,061,237 B2 6/2015 Eisenberger et al.
9,227,153 B2 1/2016 Eisenberger
9,427,726 B2 8/2016 Chaikittisilp et al.
9,433,896 B2 9/2016 Eisenberger
9,555,365 B2 1/2017 Eisenberger et al.
9,616,378 B2 4/2017 Eisenberger
9,630,143 B2 4/2017 Eisenberger et al.
9,878,286 B2 1/2018 Eisenberger
9,908,080 B2 3/2018 Eisenberger et al.
9,937,461 B2 4/2018 Eisenberger et al.
9,975,087 B2 5/2018 Eisenberger
10,239,017 B2 3/2019 Eisenberger
10,413,866 B2 9/2019 Eisenberger
11,059,024 B2 7/2021 Khunsupat et al.
11,446,634 B2 9/2022 Pang et al.
11,738,301 B2 8/2023 Holman et al.

(56) References Cited

U.S. PATENT DOCUMENTS 11,794,164 B2 10/2023 Pang et al.
11,850,570 B2 12/2023 Khunsupat et al.
2001/0004895 A1 6/2001 Preiss
2001/0047995 A1 12/2001 Pozgainer
2002/0000260 A1 1/2002 Palvoelgyi
2002/0083833 A1 7/2002 Nalette
2002/0187372 A1 12/2002 Hall
2003/0061906 A1 4/2003 Knunz
2003/0075012 A1 4/2003 Knunz
2004/0142888 A1 7/2004 Manne
2004/0213705 A1 10/2004 Blencoe
2004/0229045 A1 11/2004 Hesselmans
2004/0253159 A1 12/2004 Hakka
2005/0027081 A1 2/2005 Okushita
2005/0096438 A1 5/2005 Chang
2005/0142296 A1 6/2005 Lakshmi
2005/0180910 A1 8/2005 Park
2006/0051274 A1 3/2006 Wright
2006/0084063 A1 4/2006 Costa
2006/0101945 A1 5/2006 Lackner
2006/0105419 A1 5/2006 Blankenberg
2006/0165574 A1 7/2006 Sayari
2006/0168940 A1 8/2006 Offenhuber
2006/0178989 A1 8/2006 Lackner
2006/0186562 A1 8/2006 Wright
2006/0188423 A1 8/2006 Cadours
2006/0289003 A1 12/2006 Lackner
2007/0004023 A1 1/2007 Trachtenberg
2007/0033767 A1 2/2007 Dodson
2007/0065490 A1 3/2007 Schaberg
2007/0068525 A1 3/2007 Offenhuber
2007/0086909 A1 4/2007 Abenthung
2007/0187247 A1 8/2007 Lackner
2007/0209349 A1 9/2007 Ripper
2008/0031801 A1 2/2008 Lackner
2008/0064184 A1 3/2008 Lackner
2008/0087165 A1 4/2008 Wright
2008/0090480 A1 4/2008 Akimoto
2008/0112868 A1 5/2008 Blencoe
2008/0124666 A1 5/2008 Stocker
2008/0138265 A1 6/2008 Lackner
2008/0187755 A1 8/2008 Herfert
2008/0190567 A1 8/2008 Winsness
2008/0199613 A1 8/2008 Bhat
2008/0227169 A1 9/2008 Benson
2008/0250715 A1 10/2008 Cooper
2008/0264029 A1 10/2008 Sepaniak
2008/0289319 A1 11/2008 Eisenberger
2008/0289495 A1 11/2008 Eisenberger
2008/0289499 A1 11/2008 Eisenberger
2008/0289500 A1 11/2008 Eisenberger
2008/0314246 A1 12/2008 Deckman
2009/0101050 A1 4/2009 Lackner
2009/0110907 A1 4/2009 Jiang
2009/0232861 A1 9/2009 Wright
2009/0320368 A1 12/2009 Castaldi
2010/0095842 A1 4/2010 Lackner
2010/0105126 A1 4/2010 Wright
2010/0116137 A1 5/2010 Wright
2010/0202937 A1 8/2010 Lackner
2010/0254883 A1 10/2010 Eisenberger et al.
2010/0263534 A1 10/2010 Chuang
2010/0300289 A1 12/2010 Jiang
2010/0319537 A1 12/2010 Eisenberger et al.
2011/0000371 A1 1/2011 Eisenberger
2011/0011945 A1 1/2011 Eisenberger
2011/0027143 A1 2/2011 Wright
2011/0027157 A1 2/2011 Wright
2011/0033357 A1 2/2011 Wright
2011/0033358 A1 2/2011 Wright
2011/0041688 A1 2/2011 Eisenberger
2011/0056382 A1 3/2011 Lackner
2011/0079144 A1 4/2011 Wright
2011/0079146 A1 4/2011 Wright
2011/0079147 A1 4/2011 Wright
2011/0079149 A1 4/2011 Wright
2011/0079150 A1 4/2011 Wright
2011/0081709 A1 4/2011 Wright
2011/0081710 A1 4/2011 Wright
2011/0081712 A1 4/2011 Wright
2011/0083554 A1 4/2011 Wright
2011/0088550 A1 4/2011 Tirio
2011/0108421 A1 5/2011 Lackner
2011/0146281 A1 6/2011 Lackner
2011/0185897 A1 8/2011 Wright
2011/0189075 A1 8/2011 Wright
2011/0203174 A1 8/2011 Lackner
2011/0203311 A1 8/2011 Wright
2011/0206588 A1 8/2011 Lackner
2011/0226006 A1 9/2011 Lackner
2011/0226697 A1 9/2011 McLellan
2011/0268636 A1 11/2011 Lackner
2011/0293503 A1 12/2011 Wright
2011/0296872 A1 12/2011 Eisenberger
2012/0000364 A1 1/2012 Eisenberger et al.
2012/0058032 A1 3/2012 Lackner
2012/0076711 A1 3/2012 Gebald
2012/0167764 A1 7/2012 Eisenberger
2013/0294991 A1 11/2013 Jones
2013/0312606 A1 11/2013 Eisenberger
2013/0336722 A1 12/2013 Wright
2014/0010719 A1 1/2014 Eisenberger
2014/0026751 A1 1/2014 Anand
2014/0130670 A1 5/2014 Eisenberger et al.
2014/0145110 A1 5/2014 Eisenberger et al.
2015/0007725 A1 1/2015 Elliott
2015/0313401 A1 11/2015 Chichilnisky
2016/0367964 A1 12/2016 Chaikittisilp et al.
2017/0321656 A1 11/2017 Eisenberger et al.
2020/0009504 A1 1/2020 Eisenberger
2020/0011298 A1 1/2020 Eisenberger et al.
2020/0047116 A1 2/2020 Eisenberger
2021/0146303 A1 5/2021 Eisenberger
2022/0072470 A1 3/2022 Dunn
2022/0096991 A1 3/2022 Jones et al.
2022/0169593 A1 6/2022 Jones et al.
2023/0023050 A1 1/2023 Eisenberger et al.
2023/0149896 A1 5/2023 Eisenberger et al.
2023/0211278 A1 7/2023 Eisenberger et al.
2023/0241546 A1 8/2023 Brouillette et al.
2024/0408545 A1 12/2024 Elenowitz et al.

FOREIGN PATENT DOCUMENTS

CN 1709553 A 12/2005
CN 1769553 A 5/2006
CN 102068967 A 5/2011
CN 104624157 A 5/2015
CN 115282732 A 11/2022
DE 20001385 9/2000
EP 1180511 A1 2/2002
EP 1234947 A2 8/2002
EP 2100234 A1 9/2009
EP 2100234 B1 7/2011
FR 2543946 A1 10/1984
JP 56162813 12/1981
JP 58074471 5/1983
JP 58122022 7/1983
JP S59216839 A 12/1984
JP H02209678 A 8/1990
JP 03245811 1/1991
JP 05209678 8/1993
JP 06062677 3/1994
JP 06346856 12/1994
JP 06348189 A 12/1994
JP 07051537 2/1995
JP 09104419 4/1997
JP 11244652 9/1999
JP 2001068487 A 3/2001
JP 2001300250 A 10/2001
JP 2003326155 A 11/2003
JP 2004282109 A 10/2004
JP 2006061758 A 3/2006
JP 2006075717 A 3/2006

(56) References Cited

FOREIGN PATENT DOCUMENTS

| | | | |
|---|---|---|---|
| JP | 2008122508 | A | 5/2008 |
| WO | 1998029187 | A1 | 7/1998 |
| WO | 2005026694 | A2 | 3/2005 |
| WO | 2005037746 | A1 | 4/2005 |
| WO | 2005108297 | A2 | 11/2005 |
| WO | 2006009600 | A2 | 1/2006 |
| WO | 2006036396 | A2 | 4/2006 |
| WO | WO 2006/048182 | A1 | 5/2006 |
| WO | 2006112977 | A2 | 10/2006 |
| WO | 2008042919 | A2 | 4/2008 |
| WO | 2008063082 | | 5/2008 |
| WO | 2008144708 | A1 | 11/2008 |
| WO | WO 2010/093092 | A1 | 8/2010 |
| WO | 2010107942 | A1 | 9/2010 |
| WO | 2013166432 | A1 | 11/2013 |
| WO | 2017184652 | A1 | 10/2017 |
| WO | 2019161420 | A1 | 8/2019 |
| WO | 2019191651 | A1 | 10/2019 |
| WO | 2021/252695 | A1 | 12/2021 |
| WO | 2022104252 | A1 | 5/2022 |
| WO | 2023065735 | A1 | 4/2023 |
| WO | 2023196800 | A1 | 10/2023 |
| WO | 2023215875 | A1 | 11/2023 |
| WO | 2024006521 | A2 | 1/2024 |
| WO | 2024124194 | A1 | 6/2024 |

OTHER PUBLICATIONS

International Preliminary Report on Patentability, PCT/US2023/023747, issued Nov. 7, 2024.

EP Search Report, EP App. 21822313.9, mailed Oct. 28, 2024.

Sakwa-Novak, Miles A., et al, "Role of Additives in Composite PEI/Oxide CO2 Adsorbents: Enhancement in the Amine Efficiency of Supported PEI by PEG in CO2 Capture from Simulated Ambient Air," ACS Appl. Mater. Interfaces, vol. 7 (2015), pp. 24748-24759.

International Search Report, PCT/US2023/066670, mailed Feb. 5, 2024.

Schellevis, Michel, et al., "CO2 Capture From Air in a Radial Flow Contractor: Batch or Continuous Operation?" Frontiers in Chemical Engineering, vol. 2 (2020) (11 pgs.).

Notification concerning transmittal of international preliminary report on patentability, International application No. PCT/US2023/023747, mailed Dec. 12, 2024, 8 pages.

Chinese Office Action for Application No. 202180058344, mailed Apr. 4, 2024.

[No Author Listed] Integrated Gasification Combined Cycle IGCC. 2013. https://www.global-greenhouse-warming.com/integrated-gasification-combined-cycle-IGCC.html Last accessed Nov. 4, 2025.

[No Author Listed] The Engineering ToolBox, "Air Composition". 2003. https://www.engineeringtoolbox.com/air-composition-d_212.html Last accessed Nov. 14, 2025.

Dubey, Science for sustainability: From capturing carbon dioxide from air to environmental impact of a hydrogen economy. Los Alamos National Laboratory. Apr. 2, 2003. Pacific Forum.

Hicks et al., Designing Absorbents for CO2 Capture from Flue Gas-Hyperbranched Aminosilicas Capable of Capturing CO2 Reversibly. J. Amer. Chem. Soc. Feb. 2008; 130:2902-2903.

Leal et al., Reversible adsorption of carbon dioxide on amine surface-bonded silica gel. Inorganica Chimica Acta. 1995;240:183-199.

Park et al., Strontium B.-diketonate complexes with polyamine donor ligands: the synthesis and structural characterization of [SR(thd)2(L)]n (n=2; L=diethylenetriamine, n+1; L-triethylenetetramine, tetraethylenepentamine and tri(2-arninoethyl)amine) complex. Polyhedron. 2000;19:2547-2555.

Reynolds et al., The Preparation of Polyvinylamine, Polyvinylamine Salts, and Related Nitrogenous Resins. J. Am. Chem. Soc. Apr. 1947; 69(4): 911-915.

Rouquerol et al., Recommendations for the characterization of Porous Solids. Pure & Appl. Chem. 1994;66(8)17399-1758.

Stolaroff et al., A Pilot-scale prototype contractor for CO2 capture from ambient air; cost and energy requirements. Carnegie Melon University. 2006. W-Nw.ucalgary.ca/-keith/papers/84.Stolaroff.Air.

Vaartstra et al., Advances in Precursor Development for CVD of Barium-Containing Materials. Mat. Res. Soc. Symp. Proc. Bol. 1994;335:203-208.

PEI linear

PEI Branched

PAAEPI

PAA

PVAm

PAAPAG

Fig. 1 (a-f)

polymerization

Acid or Base hydrolysis

NH

O m $NH_2$

Poly(N-Vinyl formamide)

Poly(vinylamine)

Poly(allylamine)

Polymerization to Poly(allylamine)

Fig. 3 cross-linking of Poly(allylamine) using epichlorohydrin, PAAEPI

Fig. 4

NH2 + HN NH2 N N .HCl PBS pH 9.5 RT NH2 NH HN NH2 (1-m) m

Synthesis of PAAPAG

Amine efficiency of PEI branched, PEI linear and PAA linear at different organic loadings at 400 ppm conditions.

$CO_2$ sorption performances of PAAEPI- loaded MCF of different organic loadings in 10% $CO_2$.

Amine efficiency of PAAEPI-loaded MCF of different organic loadings in 10% $CO_2$.

$CO_2$ sorption performances of PAAEPI-loaded MCF of different loading at 400 ppm $CO_2$.

Amine efficiency of PAAEPI-loaded MCF of different organic loadings in 400 ppm $CO_2$.

$CO_2$ sorption performances of PAAPAG-loaded MCF of different organic loadings in 10% $CO_2$.

Amine efficiency of PAAPAG-loaded MCF of different organic loadings in 10% $CO_2$.

$CO_2$ sorption performances of PAAPAG-loaded MCF of different organic loadings in 400ppm.

Amine efficiency of PAAPAG-loaded MCF of different organic loadings in 400 ppm $CO_2$.

Summary of $CO_2$ adsorption capacities of PEI branched, PEI linear, PAA linear, cross-linked PAAEPI, and guanidinylated PAAPAG in 10% $CO_2$.

Summary of amine efficiency of PEI branched, PEI linear, PAA linear, cross-linked PAAEPI, guanlinylated PAAPAG in 10% $CO_2$.

Summary of $CO_2$ adsorption capacities of PEI branched, PEI linear, PAA linear, cross-linked PAAEPI, and guanidinylated PAAPAG in 400 ppm $CO_2$.

Summary of amine efficiency of PEI branched, PEI linear, PAA linear, cross-linked PAAEPI, and guanidinylated PAAPAG in 400 ppm $CO_2$.

SUPPORTED POLY(ALLYL)AMINE AND DERIVATIVES FOR $CO_2$ CAPTURE FROM FLUE GAS OR ULTRA-DILUTE GAS STREAMS SUCH AS AMBIENT AIR OR ADMIXTURES THEREOF

CLAIM OF PRIORITY

This divisional application claims the priority of its co-pending parent application, application Ser. No. 17/373,759, filed on Jul. 12, 2021, which application is a divisional application of application Ser. No. 14/063,850, filed on Oct. 25, 2013; and the priority of its ultimate parent application, provisional Application No. 61/718,267, filed Oct. 25, 2012. The disclosures of the above applications are herein incorporated by reference as if repeated herein verbatim, and the priority of its parent application. It should be noted, however, that if there are any differences or distinctions between the disclosure herein and the disclosures of the aforesaid incorporated patent application disclosures, the present updated and further refined disclosure expressly set forth herein shall be considered the proper disclosure for the support of (a) the claims set forth herein, as well as (b) the claims of patent eventuating from the present application, and including, without limitation, (c) the claims of future co-pending continuing or divisional applications.

BACKGROUND OF THE INVENTION

It is generally acknowledged that $CO_2$ plays an important role in global climate change and much effort has been devoted to developing technologies for efficient capture and sequestration of $CO_2$. Currently, large-scale separation of $CO_2$ by liquid phase amine-based absorption is in commercial operation throughout the world in natural gas separations. The technology also represents the benchmark methodology for $CO_2$ capture from flue gas (post-combustion $CO_2$ capture). Meanwhile adsorption processes based on solid adsorbents are also being evaluated by many research groups.

Low molecular weight, branched poly(ethylenimine) (PEI), has been previously proposed for $CO_2$ capture from flue gas, and for ambient air capture. This branched PEI, when impregnated into a porous host such as silica, gives an effective $CO_2$ adsorbent for extraction of $CO_2$ from flue gas (10% $CO_2$) or the ambient air (400 ppm $CO_2$) $CO_2$ adsorption from ultra-dilute gas streams (<1% $CO_2$ by volume) such as ambient air (350-450 ppm $CO_2$ by volume) requires adsorbents tuned to bind $CO_2$ very strongly. Solid amine-functionalized materials are known to effectively bind $CO_2$ and extract it from gas streams. One class of adsorbents, which we shall refer to as "class I" supported amine adsorbents, composed of polymeric amines impregnated onto a porous support, is well known to be an effective adsorbent for $CO_2$ capture from moderately dilute flue gas streams (5-20% $CO_2$ by volume). The most commonly used polymer is poly(ethyleneimine) (PEI), which contains a mixture of primary, secondary and tertiary amines. It is known that adsorbents with a higher heat of adsorption will have a steeper adsorption isotherm, leading to materials with larger adsorption capacities at low target gas partial pressures. It is known that primary amines generally have higher heats of adsorption with $CO_2$ than secondary and tertiary amines.

Accordingly, it is an objective of the present invention to provide an adsorbent that is readily supportable on a solid substrate. It is a further objective of the present invention to provide an adsorbent that has a high proportion of primary amines and lower sensible heat when heated. It is a further objective of the present invention to provide an adsorbent that is less susceptible to oxidative deterioration.

SUMMARY OF THE INVENTION

In accordance with this invention, supported amine polymer adsorbents based on polymers containing only or primarily primary amines sites are to be used as regenerable adsorbents for $CO_2$ capture from ultra-dilute gas streams, such as ambient air, and can also be useful for use at the moderate gas pressures found in typical post-combustion capture processes, such as flue gas from large point sources such as coal-fired power plants.

The preferred supported solid amine adsorbents of this invention are based on poly(allylamine) ("PAA") and poly (vinyl amine) ("PVAm"), both of which are linear polymers, and their derivatives, all of which can be effective adsorbents for the reversible adsorption of $CO_2$ from ultra-dilute gas streams (400 ppm $CO_2$) and moderately dilute gas streams (10% $CO_2$), with their performance under ultra-dilute conditions being competitive with or exceeding the prior state-of-the-art adsorbents based on supported PEI. The amine groups in both PAA and in PVAm are substantially all primary amine groups. Such derivatives include cross-linked poly(allylamine) prepared by crosslinking of poly(allylamine) with epichlorohydrin (PAAEPI), branched poly(allylamine) prepared by branching of poly(allylamine) with divinylbenzene (PAADVB) and guanidinylated poly (allylamine) (PAAPAG). These derivatives can all be supported on and within silica mesocellular foam (MCF), and on mesoporous-.gamma.-alumina, as well as on mesoporous-.gamma.-alumina coated throughout the pores of MCF. The structural formulae of these adsorbents are shown in FIGS. 1(*a*)-(*d*).

It has been found that for adsorbents to be sufficiently supportable on a porous solid support, the adsorbent should be capable of being held within the pores of the support in sufficient quantity to be able to adsorb relatively large quantities of $CO_2$. In order to be easily placed within the pore structure of porous supports, it has been found that the adsorbent have a relatively low molecular weight, and therefore have a small enough molecular size as to be capable of ready placement within the pores without blocking access to the gas mixture to be treated. For this reason poly(allylamine) materials are therefore most preferred because they are available in sufficiently low molecular weights to permit ready impregnation into the pores of the porous substrate, whereas the poly(vinylamine) polymers are not often prepared with sufficiently low molecular weights. Generally, the molecular weights of the poly(allylamine) material, including the cross-linked and guanidinylated derivatives, should be less than about 3000 Daltons, preferably less than about 2500 Daltons, and most preferably in the range of about 1000 to about 2200 Daltons.

Although the poly(allylamine) materials are generally well suited for adsorption of $CO_2$ from ambient air as well as from higher concentration $CO_2$ materials, the guanidinylated and cross-linked poly(allylamine) materials have been found to have a greater resistance to higher temperatures, and are preferred for the direct adsorption of $CO_2$ from high temperature flue gases which may contain upwards of 15% $CO_2$, but only about 5% $CO_2$, as well as the treatment of ultra-dilute gases such as ambient air, which contain 400 ppm $O_2$, but 21% $O_2$. When the regeneration of the sorbent occurs at higher temperatures and the heated sorbent is then exposed to the ambient air, the greater resistance to oxidative degradation at the higher temperatures becomes significant. This is also the case for mixtures of flue gas and ambient air having an $O_2$ content of at least 10-15% $O_2$. It is noted that linear poly(allylamine) materials also have greater resistance to oxidative degradation at the higher temperatures and especially at the higher $O_2$ levels in ambient air.

After multiple regenerations in ambient air or flow gas/air mixtures having oxygen contents of greater than 10%, and especially if greater than 15%, the $CO_2$ adsorption capacity (mol/kg sorbent) and amine efficiency (mol $CO_2$/mol amine) of linear poly(allylamine) (PAA), and its deriviatives (crosslinked poly(allylamine), prepared by crosslinking of poly (allylamine) with epichlorohydrin (PAAEPI), and guanidinylated poly(allylamine) (PAAPAG), prepared by reacting PAA with guanidine supported on silica mesocellular foam (MCF), can be greater than the corresponding supported linear or branched poly(ethyleneimine), making the poly (allylamine) compounds especially useful solid adsorbents with high capacity for $CO_2$. Their effectiveness, initially, is comparable to that of adsorbents based on supported PEI, including branched and linear low molecular weight PEI, but have been found to have greater durability, most significantly resistance to oxidative degeneration, after many regeneration cycles, followed by exposure to ambient air after each regeneration. The PAA and PVAm, in addition, both have a minimal amount of carbon atoms that add unwanted sensible heat to adsorbents used in this type of process.

In order to be commercially useful, an adsorbent must be capable of remaining active for thousands of cycles, i.e., adsorption and regeneration, during its lifetime. Although it has been generally found that PAA and PVAm behave similarly with regard to their ability to capture $CO_2$, especially at the highly dilute levels of $CO_2$ such as existing in ambient air, PAA was found to be preferred due to a greater ease and lower cost of synthesis (using presently known processes) as compared to PVAm: PAA can be made directly from the allylamine hydrochloride monomer at the desired molecular weight, whereas PVAm requires two steps, synthesis of Poly(N-Vinyl formamide) (PNVF) that is then base or acid hydrolyzed into PVAm (See FIG. 2), and has not been readily formed at the desired molecular weight size to fit within the pores of the available porous substrates.

The resistance to oxidative degeneration is present whether the PAA or PVAm polymers are supported on and in a silica mesocellular foam ("MFC") substrate or on and in a mesoporous γ-alumina substrate. Such impregnated substrates are prepared by impregnating a pre-synthesized, amine-containing organic polymer, e.g., PAA, PAAPAG or PAAEPI, into the pores of the supporting substrate. For such materials, of suitably low molecular weight, the amine loading scales with the pore volume of the support substrate.

SUMMARY DESCRIPTION OF DRAWINGS

Figure 1:
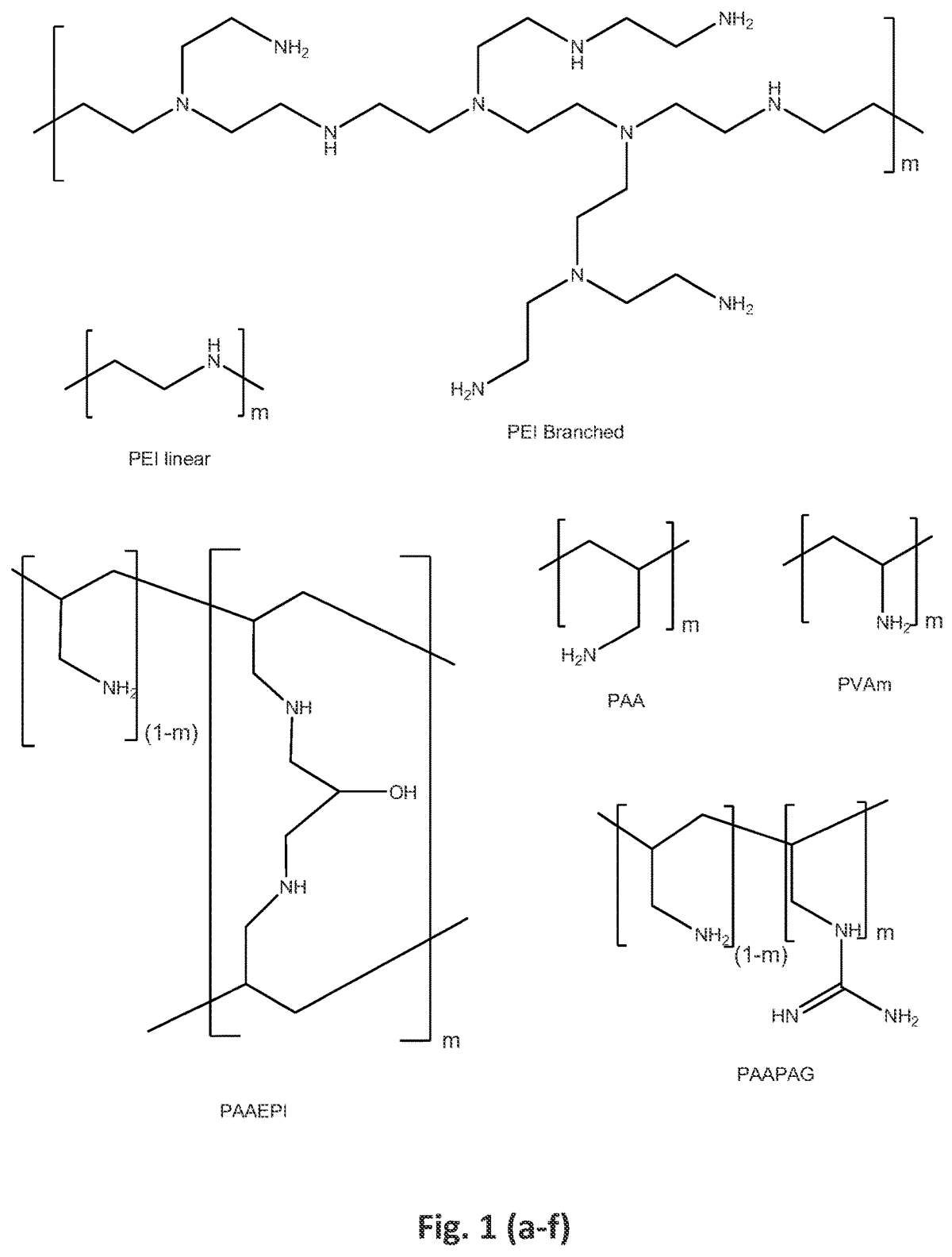

FIGS. 1(*a*)-(*b*) show the structural formulae for the prior art Polyethelamine materials used for the adsorption of carbon dioxide, and items FIGS. 1(*c*), (*d*), (*e*) and (*f*) are the structural formulae for the Poly(allylamine) and Poly(vinylamine) and their two derivatives of the Polyallylamines the crosslink Polymer with epichlorhydrin ("PAAEPI") and the guanidinylated Poly(allylamine) material ("PAAPAG");

FIG. 1(*g*) is a Schematic diagram of a PAA linear polymer at high loading, supported on MCF, to form a Class 1 supported adsorbent;

FIG. 3 shows the structural formula for the crosslinking reaction to form Poly(allylamine);

FIG. 4 shows the structural formula for the crosslinking reaction with epichlorhydrin to form Poly(allylamine)epi ("PAAEPI);

Figures 5, 6:
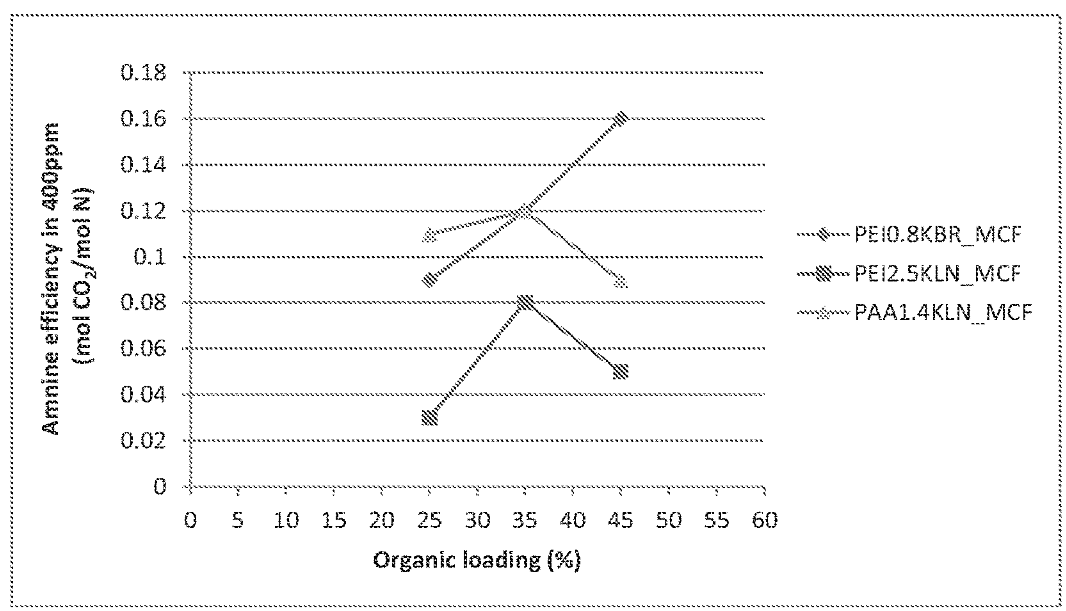
FIG. 5 shows the structural formula for the guanidinylation of Poly(allylamine), to form PAAPAG.
Figure 7:
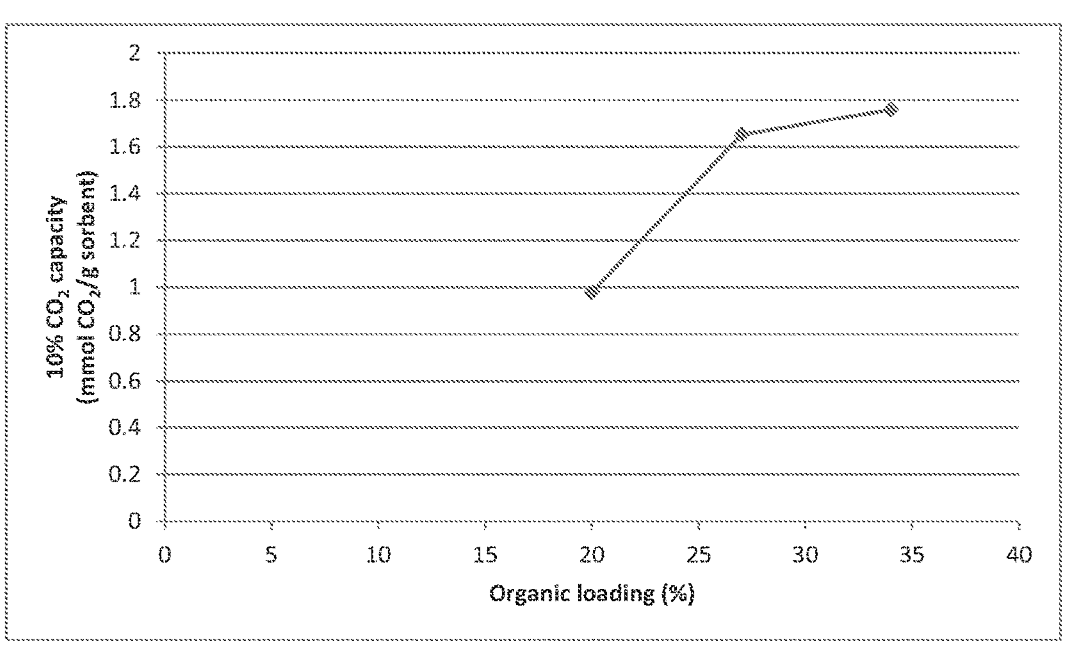
Figure 8:
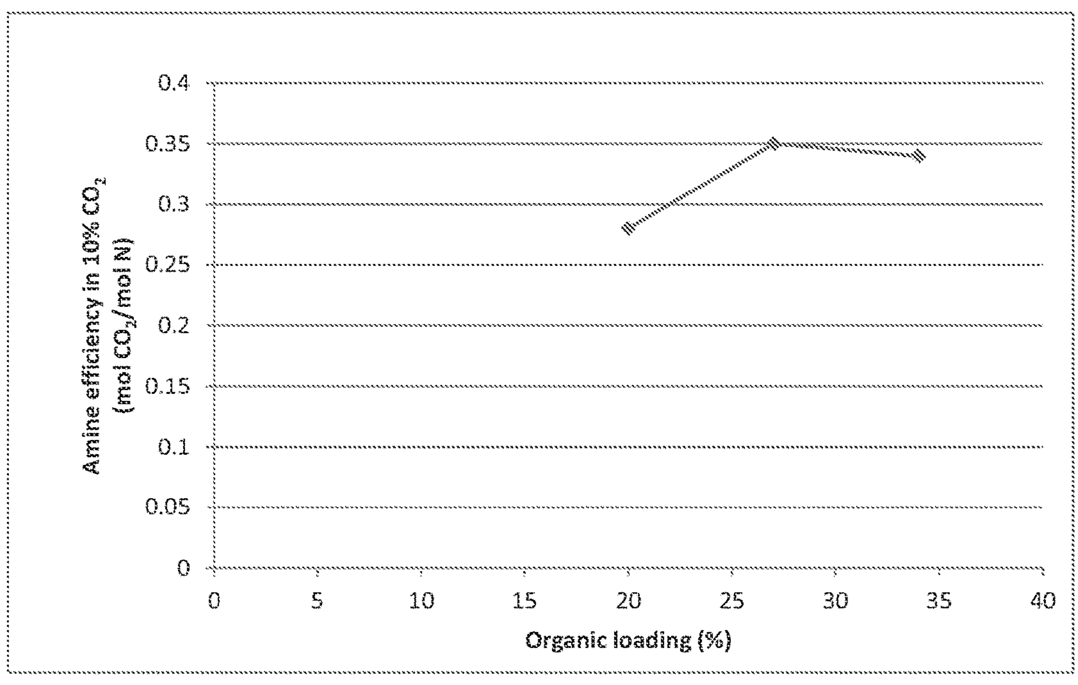
Figure 9:
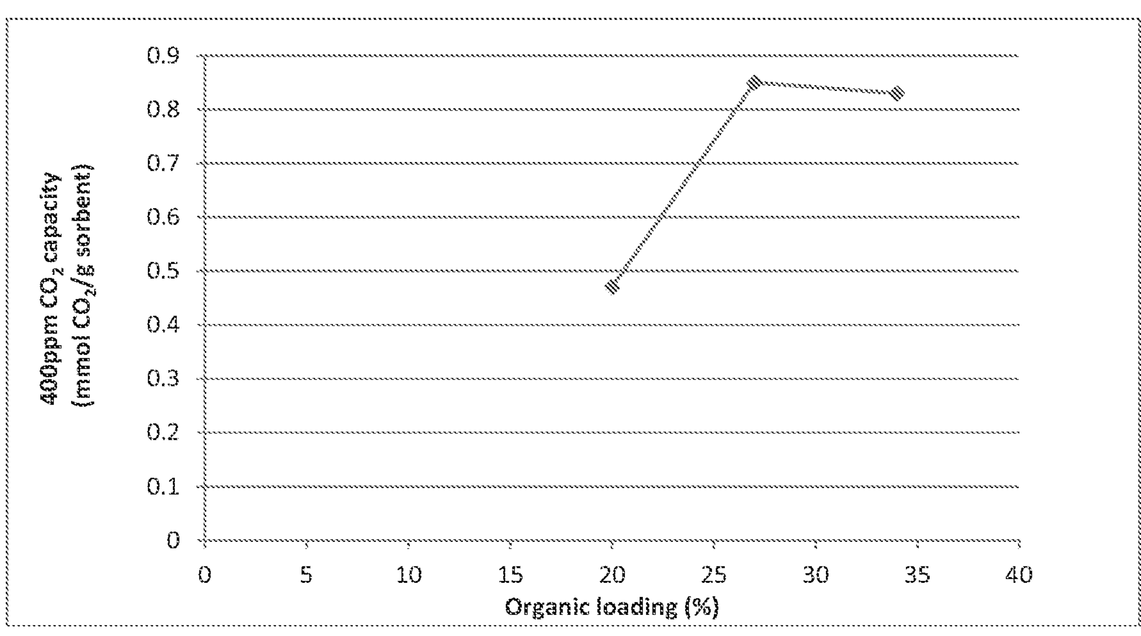
Figure 9:
Figure 10:
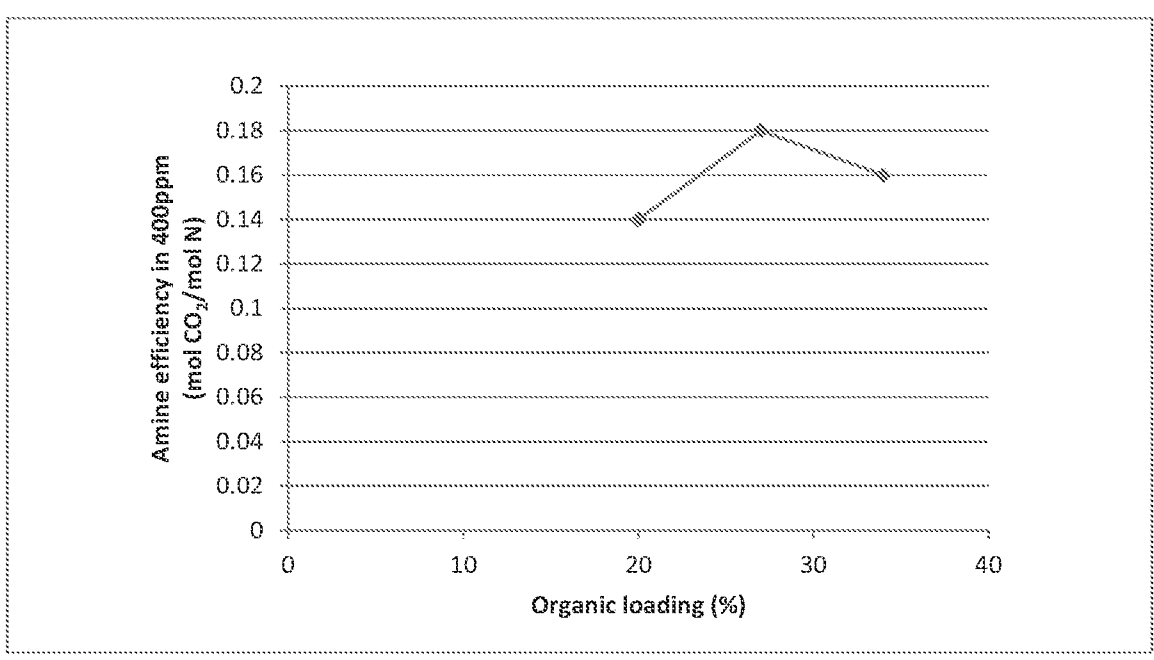
Figure 11:
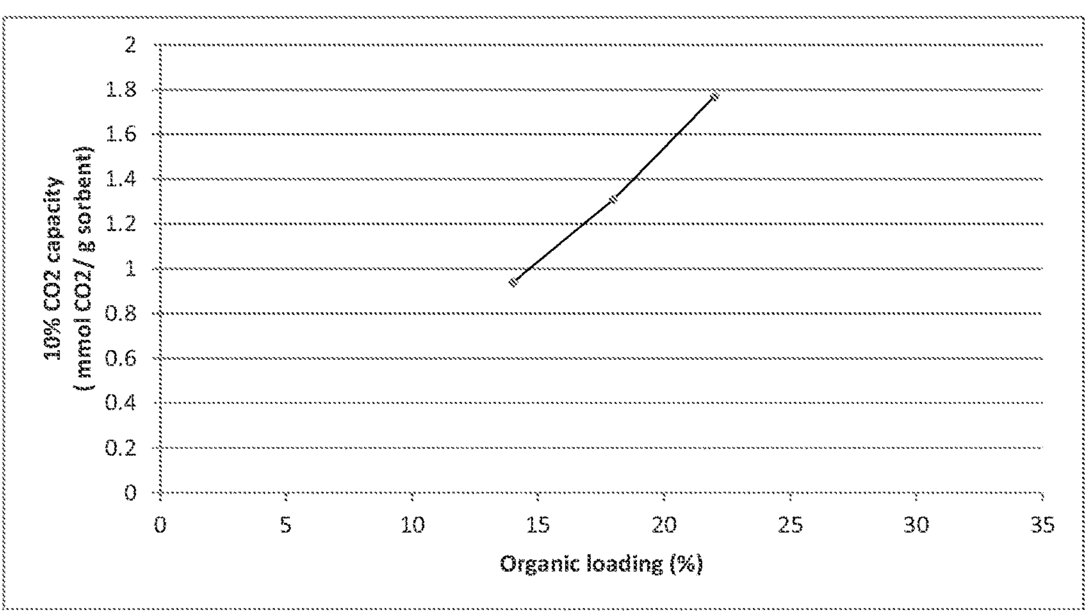
Figure 12:
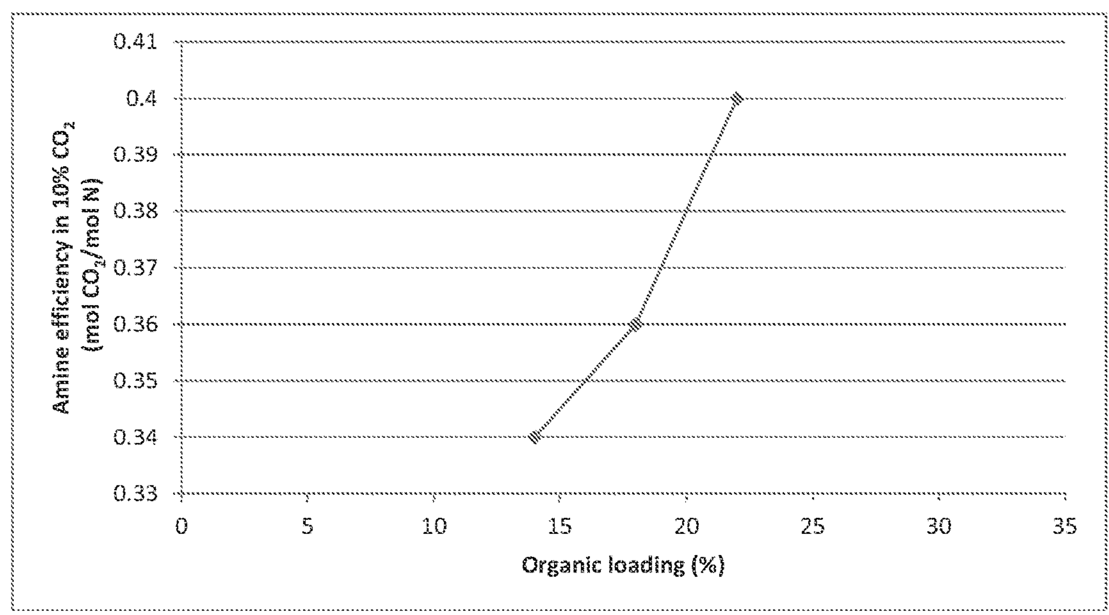
Figure 13:
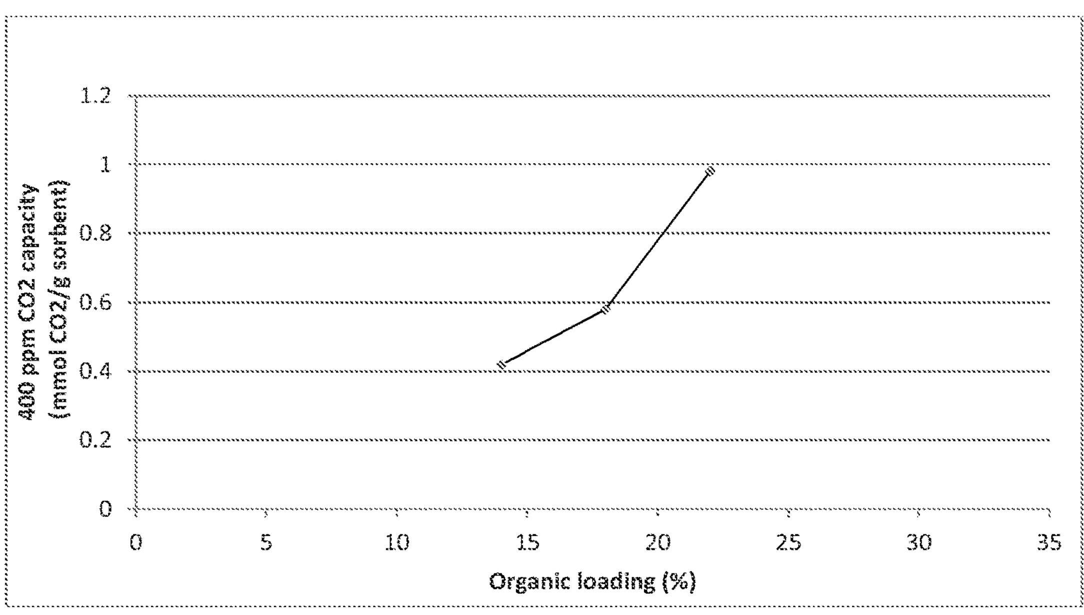
Figure 14:
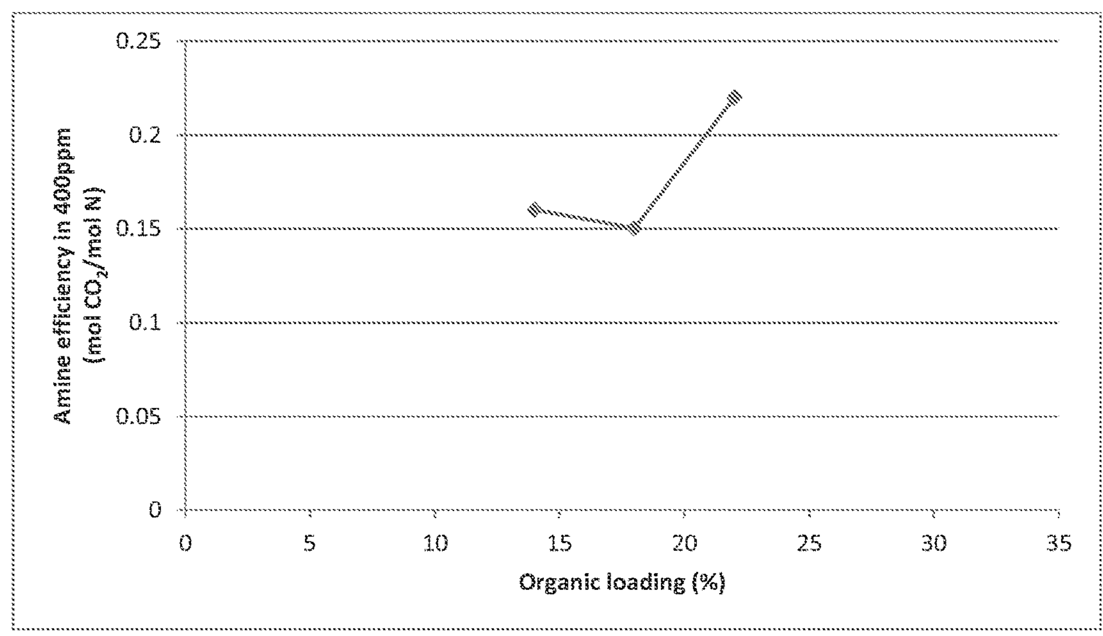
Figure 15:
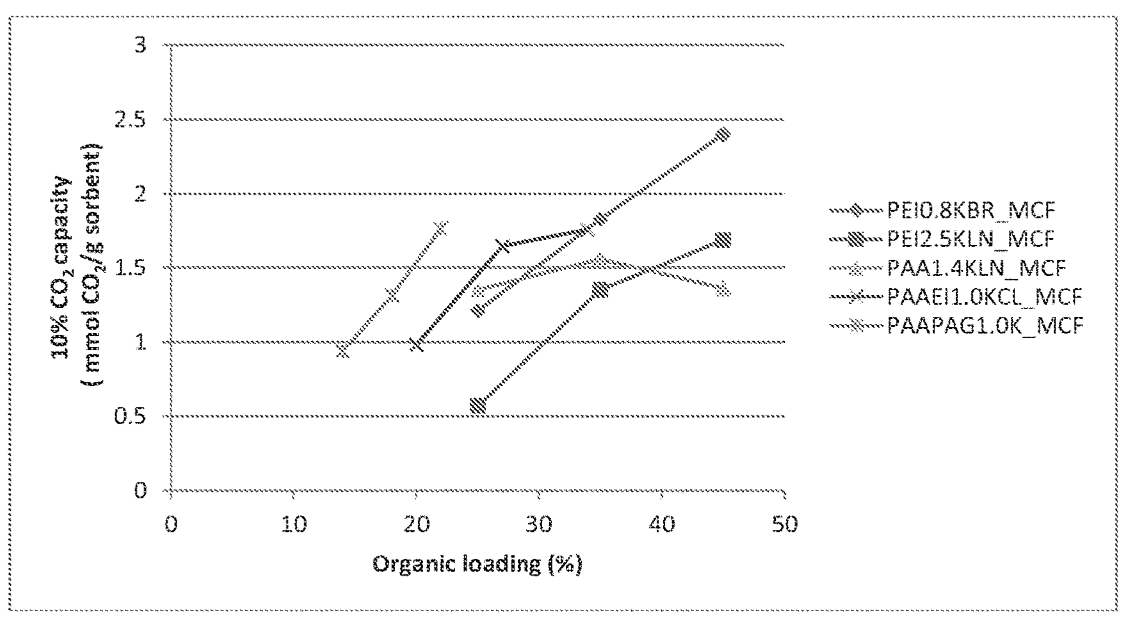
Figure 16:
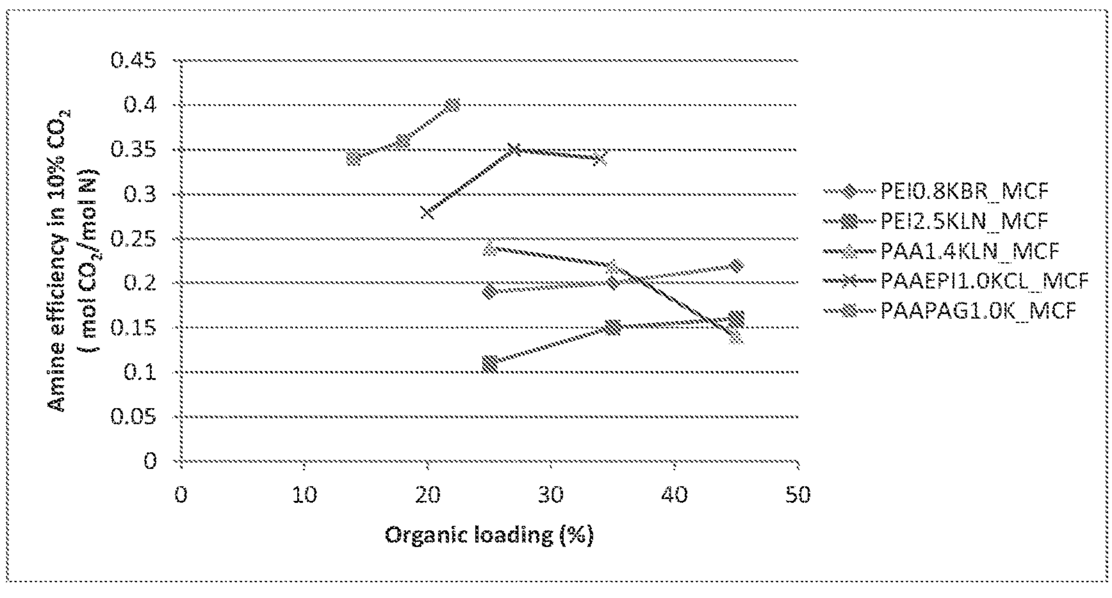
Figure 17:
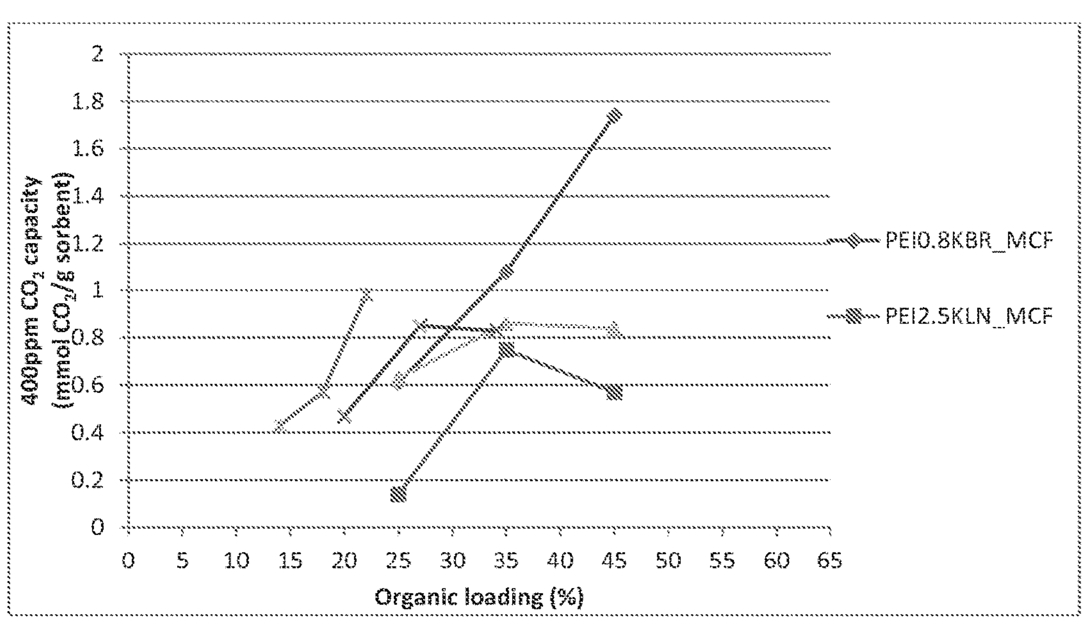
Figure 18:
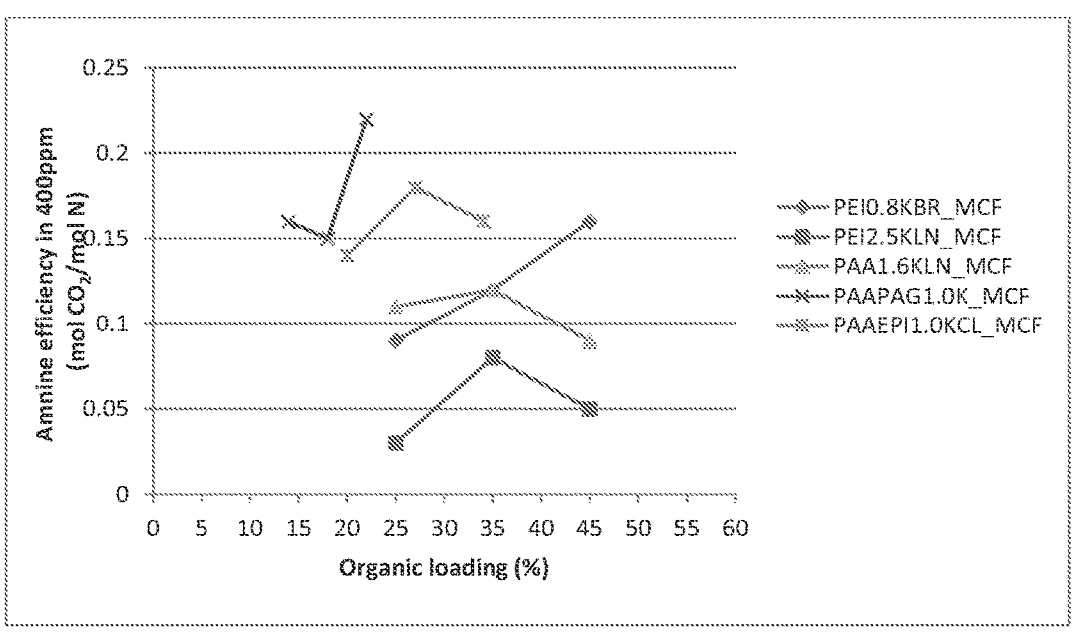

FIG. 6. is a graph showing the Amine efficiency of PEI branched, PEI linear and PAA linear at different organic loadings at 400 ppm conditions;

FIG. 7. is a graph showing the $CO_2$ sorption performances of PAAEPI-loaded MCF of different organic loadings in 10% $CO_2$;

FIG. 8. is a graph showing the Amine efficiency of PAAEPI-loaded MCF of different organic loadings in 10% $CO_2$;

FIG. 9 is a graph showing the $CO_2$ sorption performances of PAAEPI-loaded MCF of different loading at 400 ppm $CO_2$;

FIG. 10 is a graph showing the Amine efficiency of PAAEPI-loaded MCF of different organic loadings in 400 ppm $CO_2$;

FIG. 11 is a graph showing the $CO_2$ sorption of PAAPAG-loaded MFC of different organic loadings in 10% $CO_2$;

FIG. 12 is a graph showing the Amine efficiency of PAAPAG-loaded MFC of different organic loadings in 10% $CO_2$;

FIG. 13 is a graph showing the $CO_2$ sorption performances of PAAPAG-loaded MFC of different organic loadings in 400 ppm $CO_2$;

FIG. 14 is a graph showing the Amine efficiency of PAAPAG-loaded MFC of different organic loadings in 400 ppm $CO_2$;

FIG. 15 is a graph showing the summary of $CO_2$ adsorption capacities of PEI branched, PEI linear, PAA linear, cross-linked PAAEPI, and guanidinylated PAAPAG in 10% $CO_2$;

FIG. 16 is a graph showing the summary of amine efficiency of PEI branched, PEI linear, PAA linear, cross-linked PAAEPI, and guanidinylated PAAPAG in 10% $CO_2$;

FIG. 17 is a graph showing the summary of $CO_2$ adsorption capacities of PEI branched, PEI linear, PAA linear, cross-linked PAAEPI, and guanidinylated PAAPAG in 400 ppm $CO_2$; and FIG. 18 is a graph showing the summary of amine efficiency of PEI branched, PEI linear, PAA linear, cross-linked PAAEPI, and guanidinylated PAAPAG in 400 ppm $CO_2$.

DETAILED EXAMPLES OF THE INVENTION

The following are preferred examples of the present invention.

Materials

The following chemicals were used as received from the supplier: Allylamine hydrochloride (AAHCI, TCI), Isopropanol anhydrous (IPA, 99.5%, Alfa Aesar), Methanol (MeOH, 99.5%, Sigma Aldrich), 2,2-Azobisiobutyric acid dimethyl ester (MAIB, 98%, AK Scientific), 2,2'-Azobisisobutyronitrile (AIBN, 98%), Epichlorohydrin (EPI, 99.5%, Sigma Aldrich), Strongly basic ion exchange resin (Ambersep 900 OH form, Sigma-Aldrich), Poly(acrylamide) GC standards (PAM2950, PAM15K, PAMI00K, American polymer standards), Water for GPC (TraceSelect, Sigma Aldrich), pluronic PI23 EO-PO-EO triblock copolymer (P-123, Sigma-Aldrich), 1,3,5-trimethylbenzene (TMB, 97%, Sigma-Aldrich), tetraethyl orthosilicate (TEOS, 98%, Sigma-Aldrich), ammonium fluoride (NH4F, >96%, AlfaAesar), hydrochloric acid (HCl, cone. 37%, J. T. Baker), Poly(ethylenimine) branched, Mw 800 Da (PEI branched, Sigma-Aldrich), Poly(ethylenimine) linear, Mw 2,500 Da (PEI linear, Polyscience). 1H-pyrazole-Icarboxamidine monohydrochloride (PC, 99%, ACROS), Phosphate buffer (PBS, pH 7.4, AMRESCO); pseudobomite (Catapal B, 74.3% Al.sub.2O.sub.3, anhydrous isopropanol (99.5%, Alfa Aesar), methanol (200 proof, J. T. Baker), ethanol (99.5%, ACROS), strongly basic ion-exchange resin (Ambersep®-900-(OH), Fluka), nitric acid (68%, J. T Baker).

Synthesis of Polymers

Synthesis of Poly(vinylamine), PVAm

Figures 1G, 2:
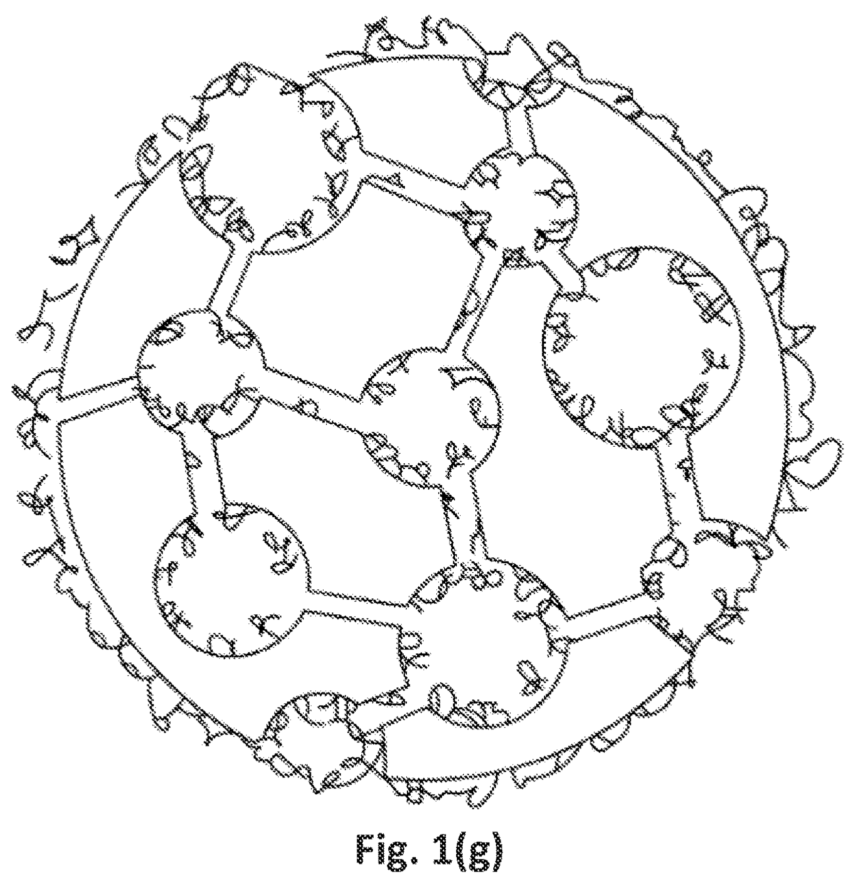
FIG. 2 shows the structural formulas for preparation reactions to form Poly(vinylamine) with the intermediate formation of Poly(N-Vinylformamide)

The synthesis route toward PVAm involved free-radical polymerization of (N-vinyl) formamide, to yield poly(N-Vinyl formamide), PNVF, that was base or acid hydrolyzed into PVAm (FIG. 2).

Synthesis of Poly(N-Vinyl Formamide), PNVF Intermediate

A mixture of (N-vinyl) formamide 2.00 g (0.03 mol), 2-propanol 10 mL and AIBN 0.36 mg (18 wt % relative to the monomer) were degassed by three freeze-pump-thaw cycles (77K). The polymerization was carried out in an oil bath at 65.degree. C. for 18 h under argon atmosphere. The polymer was precipitated by excess acetone two times to remove unreacted monomer then dried under vacuum for 24 h to give PNVF 1.8 g (90%). HNMR (D2O, ppm) 1.57 (2H, —CH2-), 3.79 (1H, —CH—), 7.90 (1H, HCO—).

Hydrolysis of PNVF to PVAm

The solution of PNVF, 1.5 gin 73.0 g of 2N NaOH (2 wt % polymer concentration) was degassed by argon purging for 1 hour. Then the solution was kept at constant temperature 75.degree. C. for 64 hours to reach complete hydrolysis with 100% conversion [See Bromberg, L.; Hatton, T. A; Polymer, 2007, 48, 7490-7498.]. After cooling to room temperature, the resulting PVAm polymer was acidified with concentrated HCl to precipitate the PVAm-HCl salt. The precipitate was washed with methanol to neutral pH and dried under vacuum to give 1.3 g (90%).sup.IR NMR (D2O, ppm): 2.16 (2H, —CH2-), 3.74 (1H, —CH—) as shown in FIG. 2.

PVAm was obtained by using a strongly basic ion exchange resin to remove the salt. Additional degassed deionized water (30 ml) and 16 g strongly basic ion exchange resin (Amberlyst 900) were added to the mixture and stirred for 1 h. The solution of PVAm polymer at pH 12.0, was filtered, the solvents was removed by vacuum and it was dried under vacuum for 24 h to give 1.40 g product (90%).

Figures 3, 4:
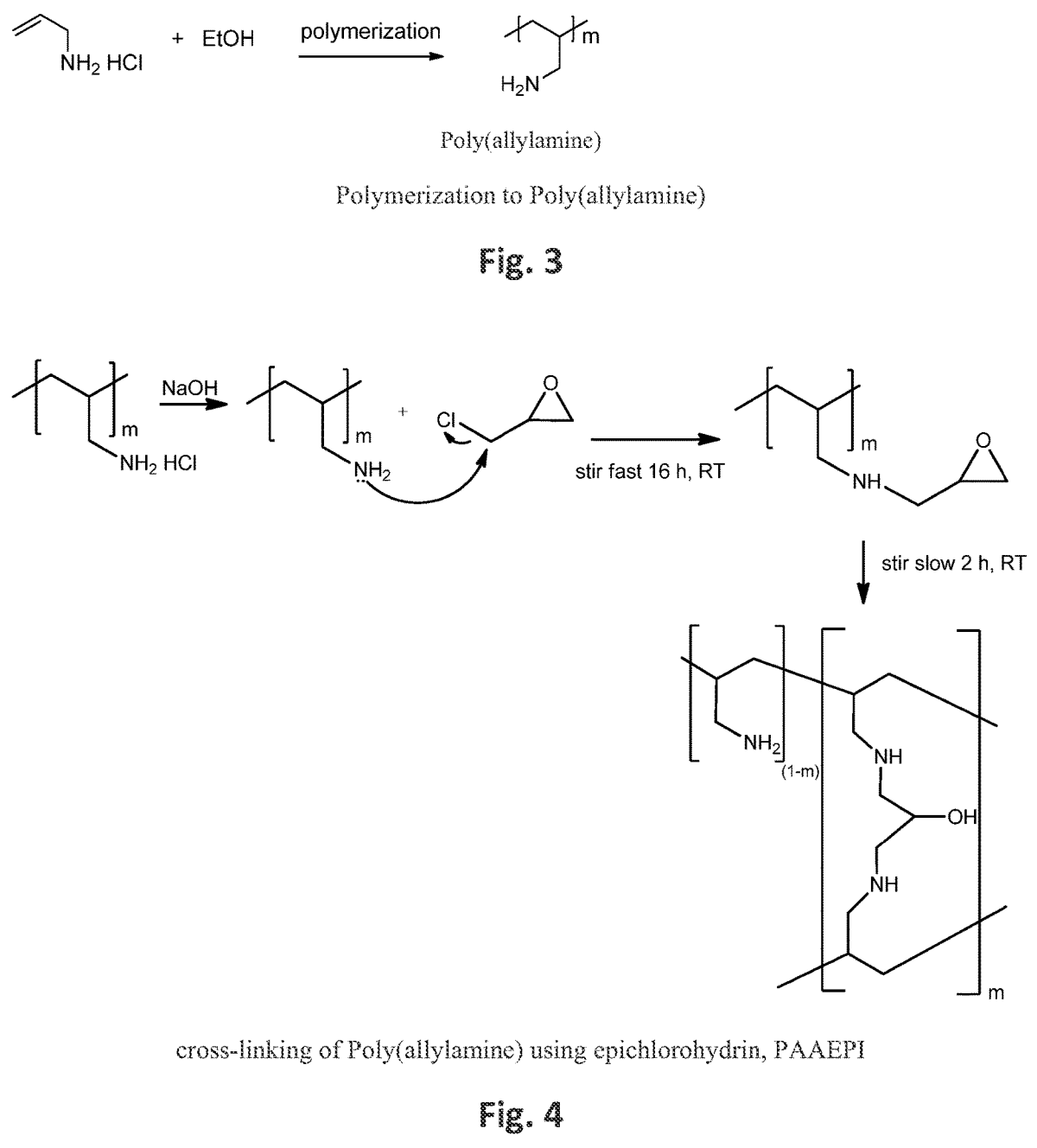

Synthesis of Poly(allylamine), PAA (FIG. 3)

The solution of allyl amine hydrochloride 6 g (0.06 mol), isopropanol 3.99 g and MAIB 0.79 g (3.43 mmol) was deaerated by argon purging for 1 h. The free radical polymerization was carried out at a constant temperature of 60.degree. C. for 48 h. The resulting polymer was washed with excess methanol to remove unreacted monomer. PAA-HCl was recovered by filtration and dried under vacuum at room temperature for 24 h to give 4.50 g of white powder (70%). HNMR (D2O, ppm): 1.35 (2H, —CH2-), 1.89 (1H, —CH—), 2.85 (2H, —CH2-). IR(KBr): ~3500 cm and 3300 cm ((N—H) of NH2), two sharp peaks consistent with primary amines, ~2,700 $cm^{-1}$ ($sp^3$ C—H stretching of CH2), 1600 and 1480 $cm^{-1}$ (N—H of $NH_3^+$), ~1390 $cm^{-1}$ (C—H bending of CH2). A broad band in the range ~1000 $cm^{-1}$ (out-of-plane bending of N—H).

PAA was obtained by using a strongly basic ion exchange resin to remove the salt. Additional degassed deionized water (30 ml) and 16 g strongly basic ion exchange resin (Amberlyst 900) were added to the mixture and stirred for 1 h. The resulting polymer solution (pH 12) was filtered, the solvent was removed by vacuum and the polymer dried under vacuum for 24 h to give 4.0 g of product (60%). $^1$H NMR (D2O,ppm): 1.10 (2H, —CH2-), 1.51 (1H, —CH—), 2.55 (2H, —CH2-). The weight average molecular weight was measured to be 1412 Da.; PDI was about ca. 1.

Synthesis of Soluble Cross-Linked Poly(Allylamine) Using Epichlorohydrin, PAAEPI The synthesis route of PAAEPI is shown in FIG. 4. A 20% w/v solution of linear PAA-HCl was prepared under argon atmosphere. PAA-HCl 2.0 g (0.02 mol) and degassed H.sub.2O 8 g were mixed. NaOH 0.72 g was added. When the temperature of the solution dropped to ambient temperature (the dissolution of NaOH is exothermic), EPI 84 uL (1.07 mmol) was added. The reaction mixture was vigorously stirred for 16 h and slowly stirred for an additional 2 h. The soluble cross-linked PAAEPI was obtained by using the strongly basic ion exchange resin to remove the salt. Additional degassed deionized water 30 ml and 16 g strongly basic ion exchange resin (Amberlyst 900) were added to the mixture and it was stirred for 1 h. The resulting solution of cross-linked PAA polymer, pH 14.0, was filtered, the solvent was removed by vacuum and the polymer was dried under vacuum for 24 h to give 1.8 g product (90%). $^1$H NMR ($D_2O$, ppm): 1.15 (2H, —CH2-), 1.56 (1H, —CH—), 2.65 (2H, —CH2-). IR(KBr): ~3300 $cm^{-1}$ ((N—H stretching) of $NH_2$), ~2900 $cm^{-1}$ ($sp^3$ C—H stretching of CH2), ~1600 $cm^{-1}$ and 1490 $cm^{-1}$ (N—H bending of NH2), ~1400 $cm^{-1}$ (C—H bending of CH2). The weight average molecular weight was measured to be 1000 Da.; PDI was about ca.1.[1] Note that the lowest Mn and Mw standard used here is poly(acrylamide) of ca.2765 and 3350 Da, respectively. Many polymers produced here are of lower molecular weight, hence, molecular weight data are often extrapolated outside the calibration range. Given this fact and that the calibration polymers are of different type [poly(acrylamide)], the molecular weight and PDI data are not rigorously quantitative and should be viewed as a very rough estimate.

Synthesis of Guanidinylated Poly(Allylamine), PAAPAG

The synthesis of PAAPAG is shown in FIG. 5. PAAI 0.00 g (0.017 mol) was dissolved in 50 mL of PBS and then 0.40 g (2.728 mmol) of PC was added. The molar ratio of PAA and PC, which contributes the guanidinylated group, is 6.4:1. The guanidinylation reaction was performed under weakly basic conditions, pH 9.5, at room temperature for 60 h. Then 16 g strongly basic ion exchange resin (Amberlyst 900) was added to the mixture and it was stirred for 1 h to remove the salt. The solvent was removed by vacuum and the polymer was dried under vacuum for 24 h. $^1$$^1$H NMR (D2O, ppm): 1.20 (2H, —CH2-), 1.55 (1H, —CH—), 2.65 (2H, —CH2-), 3.17 (2H, —CH2-). IR(KBr): ~3500 cm-1 ((N—H) of NH2, ~2900 cm-1 (wide and strong overlapping peak from (N—H) of NH2 and ($sp^3$ C—H stretching) of CH2, ~1500 $cm^{-1}$ (N—H bending of NH2), ~1400 $cm^{-1}$ (C—H bending of CH2). The weight average molecular weight was measured to be 1000 Da.; PDI was about ca. 1.

TABLE 1

Molecular weight distributions from GPC.

| Sample ID | Retention time (min) | Mn | Mw | PDI |
|---|---|---|---|---|
| PAM2590 | 54.54 | 2765 | 3350 | 1.21 |
| PAM15K | 49.57 | 12800 | 15500 | 1.21 |
| PAMI00K | 43.15 | 50000 | 99000 | 1.98 |
| PAA | 57.53 | 1412 | 1412 | 1.00 |
| PAAEPI | 58.65 | 1000 | 1000 | 1.00 |
| PAAPAG | 58.56 | 1047 | 1047 | 1.00 |

Synthesis of Silica Mesocellular Foam, MCF

A solution of PI23 16.0 g, water 260 g and 47.4 g of concentrated HCl were stirred for 24 h to complete copolymer dissolution. The flask was then transferred to a 40.degree. C. oil bath and TMB 1.6 g was added. The mixture was stirred at 40.degree. C. for 2 h, then TEOS 34.6 g was added. The solution was stirred additional for 5 min and then left quiescent for 20 h at 40.degree. C. A solution of NH4F 0.184 gin deionized water 20 mL was added as a mineralization agent—and the mixture was swirled for 5 min before aging at constant temperature of 100° C. for 24 h. The resulting precipitate was filtered, washed with excess water, dried, and calcined in air at 550° C. for 6 h (1.2° C./min ramp). A typical silica MCF was obtained, 15 g (95%).

Synthesis of Mesoporous γ-Alumina

Gamma alumina was synthesized according to earlier reported procedure by surfactant P-123@ mediated self-assembly of pseudoboehmite nano particles. In a typical procedure, 13.75 g of commercial pseudoboehmite from Sasol North America (Catapal B, 74.3% $Al_2O_3$) was peptized in a mixture of 1.27 g nitric acid (Fischer Scientific, ~70%) and 200 mL deionized water. The suspension obtained was further sonicated for 90 min at room temperature. The sonicated suspension was then stirred at 60° C. for 17 h after which it was cooled to room temperature. The peptized alumina thus obtained was slowly added to a solution of 15.30 g Pluronic PI23@ in 200 mL ethanol (200 proof). The resulting solution was further stirred at room temperature of 24 h. Subsequently the solvent was evaporated completely at 60.degree. C. The resulting P-123@-alumina composite was further dried at 75° C. for 24 h. The white sol-gel derived mesoporous γ-alumina was obtained by calcination of this composite at 700° C. for 4 h with a heating ramp of 1° C./min and an intermediate step of 150° C. for 1 h to remove the water and ethanol.

Impregnation of Amine Polymers in MCF

The amine polymer-loaded MCF samples in different weight percentage loadings were prepared by a wet impregnation method. In a typical preparation, the desired amount of amine polymer was dissolved in methanol under stirring for about 15 min while purging the mixture with argon gas, until the polymer dissolved completely. Then, the necessary amount of calcined MCF was added to the mixture. The resulting mixture was stirred for 16 h under an argon atmosphere. The mass ratio of methanol:MCF was always maintained constant at 28: I for each sample, while the ratio of MCF:polymer was varied in each case. The resulting final solid was recovered by removal of the solvent under vacuum and drying under vacuum at ambient temperature for 24 h. The as-prepared adsorbent were denoted as X_MCF_Y, where X represents the amine polymer, Y represents the polymer weight percentage in the sample. PEI branched, PEI linear, PAA linear, cross-linked PAAEPI, guanidinylated PAAPAG are referred to as PEI0.8KBR, PEI2.5KLN, PAA1.4KLN, PAAEPII.0KCL, PAAPAGI.0K, respectively.

Characterization of Amine Polymer Loaded MFC Materials

The polymer structure was characterized using solution $^1H$ NMR. The measurements were performed using a Mercury Vx 400 MHz with D20 as solvent. FT-IR spectroscopy was performed using a Bruker Vertex 80v (KBr). Molecular weights of the polymers were determined by Gel Permeation Chromatography, GPC, at 30° C. The GPC system was comprised of a Shimadzu LC-20AD pump, a Shimadzu RID-I OA RI detector, a Shimadzu SPD-20A UV detector, a Shimadzu CTO-20A column oven, and Vise tek TSK Viscogel PWXL Guard, G3000, G4000, and G6000 columns mounted in series. The mobile phase consisted of 0.05 M NaNO3 and the flow rate was maintained at 0.4 mL/min. Poly(acrylamide) standards were used (Mw 3350, 15500, 99000), (Mn 2765, 12800, 45600). The surface area, total pore volume and pore size distributions were determined by N2 adsorption-desorption isotherm measurements at 77 K using a Micromeritics TRISTAR2002. The samples were degassed under vacuum at 100° C. overnight before the adsorption measurements. The surface area was determined by the Brunauer-Emmett-Teller (BET) method. Total pore volume, and cell and window pore size were calculated using the Broekhoff-de Boer method with the Frenkel-Halsey-Hill (BdB-FHH) modification. Total pore volume was calculated from the amount of absorbed N2 at P/Po=0.99. The organic loading of the materials was characterized by combustion using a Netzsch STA409 TGA under a flowing nitrogen diluted air stream. About 10 mg of the sample was heated from 27-740° C. at a rate of 10.degree. C./min.

$CO_2$ Adsorption on Amine Polymer Loaded MFC Materials

The $CO_2$ adsorption characteristics of the amine polymer-loaded MCF materials were characterized using a TA Q500 thermogravimetric analyzer. A sample weight of about 20 mg of sorbent was loaded in a platinum vessel and tested for $CO_2$ adsorption performance. The initial activation of the sample was carried out at 120.degree. C. for 3 h after heating to that temperature at 5° C./min rate under an Ar flow of a 100 ml/min. Then, the temperature was decreased to 25° C. and held for 1 h at that temperature before introducing $CO_2$. Adsorption was then initiated by exposing the samples to the dry target gas of desired concentration (400 ppm $CO_2$ or 10% $CO_2$ balanced with Ar) at a flow rate of 100 ml/min. The adsorption experiment was performed until the pseudo-equilibrium capacity was reached, which was determined to be the time when the weight gains from adsorbed $CO_2$ changed by less than 0.0001%/min. The adsorption runs were conducted for 12 h for 400 ppm gas experiments and 3 h for 10% $CO_2$ experiments. Table 1 displays molecular weight distributions obtained from GPC experiments.

Impregnation of Poly(Allyamine) (PAA) and Branched Poly (Ethyleneimine) (PEI) Amine Polymers in Mesoporous Alumina Poly(allylamine) PAA-, and branched poly(ethyleneimine) PEI-=impregnated mesoporous alumina sorbents were prepared by wet impregnation of method described previously (see Oxidative Stability of Amino Polymer-Alumina Hybrid Adsorbents for Carbon Dioxide Capture, by Bali et al., Energy Fuels 2013, 27, 1547-1554. In a typical synthesis, 1.0 g of alumina support was dispersed in 15.0 mL of methanol (sigma Aldrich, ACS reagent). To the resulting suspension was added drop wise a solution of the calculated amount of polymer (branched-PEI/PAA) in 20 mL of methanol. The resulting solution was stirred at room temperature for another 24 h after which the methanol was evaporated on a rotary evaporator. The obtained PEI/PAA impregnated sorbents were further dried in high vacuum line (~20 mtorr) at room temperature.

Oxidation of PAA and PEI Amine Polymer Loaded Mesoporous Alumina Materials

The evaluation of the oxidative stability of the synthesized sorbent materials was carried out in a fixed bed contactor. In a typical oxidation experiment, the PAA and PEI impregnated alumina sorbents (400 mg) were packed into a Pyrex tube, 1 cm in diameter, with a frit at the center to allow the flow of gas through the sample without loss of the adsorbent from the reactor. To remove residual water from the system, the sorbent was treated at 110° C. under flowing nitrogen at 15 mL/min 2 h prior to switching it to oxidation gas stream. The temperature was then set to the desired oxidation temperature (110° C., 70° C.), and the flow was switched to the desired $O_2$ concentration (21% and 5% by volume in $N_2$) for the predetermined time of oxidation of 20 h. The oxidation gas was maintained at 15 mL/min through the reactor during the course of oxidation, after which the reactor was cooled and the adsorbent samples were recovered for further characterization and $CO_2$ uptake experiments using TGA. The oxidized alumina impregnated PAA/PEE samples have been designated as ALPAA/PEE_PercentOxygen_Temperature of oxidation.

Characterization of Amine Polymer Loaded Mesoporous Alumina Materials

The organic loading relative to alumina support was determined by TGA analysis. The TGA analysis was performed on the adsorbents using a Netzsch STA409PG thermogravimetric analyzer (TGA). The organic groups (amines) on the inorganic support alumina were combusted while measuring the change in total mass. The ramp rate was 10° C./min under a mixed gas stream comprising of air flowing at 90 mL/min and nitrogen flowing at 30 mL/min. Nitrogen physisorption measurements were carried out on a Micromeritics Tristar II 3020 instrument. Before the measurement the samples were degassed under vacuum at 110° C. for at least 15 h. Surface areas, pore diameters, and pore volumes were calculated from the collected isotherm data. Surface areas were calculated using the Brunauer Emmett Teller (BET) method, and pore diameters and pore volumes were calculated using the Broekhoff-de Boer-Frenkel Halsey Hill (BdB-FHH) method. Powder X-ray diffraction (XRD) patterns were collected on a PANalytical X'pert diffractometer with a Cu—K-alpha X-ray source. The $^{13}C$ cross-polarization magic angle spinning (CP-MAS) solid-state nuclear magnetic resonance (NMR) measurements were carried out on a Bruker DSX-300 spectrometer. The samples were spun at a frequency of 10 kHz, and 16000-18000 scans were taken for each sample.

$CO_2$ Adsorption on Fresh and Oxidized Amine Polymer Loaded Mesoporous Alumina Materials A TA Instruments Q500 TGA was used to measure the adsorption capacities of the materials under dry $CO_2$ capture conditions. The adsorbent materials were loaded into the platinum sample pan and helium was flowed through the sample chamber, while its temperature was ramped to 110° C. The temperature was held constant at 110° C. for 3 h to remove residual water, and $CO_2$ potentially adsorbed from the atmosphere. The sample chamber was then cooled to 50° C. After stabilization at 50° C. for 1 h, the gas flow was switched to 10% $CO_2$ in helium, and the subsequent weight gain because of adsorption of $CO_2$ was measured. The adsorption was done for 6 h to approach equilibrium capacities for all the tested adsorbents.

Results and Discussion

Resulting of Discussion Regarding Amine Polymer Loaded MFC Materials

The thermochemical and physical properties of MCF and the organic loading in the composite adsorbents were measured by TGA. For the bare MCF material after template removal through calcination, thermogravimetric analysis showed a negligible mass loss of 1.0% attributable to a small amount of silanol condensation. This small mass loss has negligible effect on subsequent thermogravimetric analyses of the polymer loaded mesoporous materials that are used to assess the organic loadings in the composites. For PAA, the significant mass loss occurred when the samples were heated from 27-740° C. The PAA-loaded MCF samples displayed a mass loss of about 10% over the 27° C. to 160° C. range. This can be attributed to desorption of moisture. No obvious mass loss occurred from 160-300° C. The PAA in MCF began to decompose above 300° C. with in all samples. At 740° C., the PAA was completely decomposed and fully removed as volatile species. These results indicate the maximum stability temperature of these samples under these conditions is about 300.degree. C. Other samples were measured in a similar manner.

TABLE 2

Textural properties of MCF materials before and after polymer loading.

| Sample ID | Cell diameter (nm) | Window (nm) | Adsorption Pore volume ($cm^3$ $g^{-1}$) | Desorption Pore volume ($cm^3$ $g^{-1}$) | BET surlace area ($cm^2$ $g^{-1}$) |
|---|---|---|---|---|---|
| MCF | 39 | 17 | 2.7 | 2.7 | 660 |
| PEI0.8KBR_MCF 25 | 39 | 17 | 2.1 | 2.1 | 330 |
| PEI0.8KBR_MCF 35 | 39 | 17 | 1.5 | 1.5 | 221 |
| PEI0.8KBR_MCF 45 | 39 | 17 | 0.8 | 0.8 | 118 |
| PEI2.5KLN_MCF 25 | 39 | 17 | 2.1 | 2.1 | 365 |
| PEI2.5KLN_MCF 35 | 39 | 17 | 1.8 | 1.8 | 300 |
| PEI2.5KLN_MCF 45 | 39 | 17 | 1.5 | 1.5 | 226 |
| PAA1.4KLN_MCF 25 | 39 | 17 | 1.5 | 1.5 | 258 |
| PAA1.4KLN_MCF_35 | 39 | 17 | 1.2 | 1.2 | 190 |
| PAA1.4KLN_MCF 45 | 39 | 17 | 0.8 | 0.8 | 129 |
| PAAEPII.OKCL MCF 20 | 39 | 17 | 1.9 | 1.9 | 334 |
| PAAEPII.OKCL MCF 27 | 39 | 17 | 1.4 | 1.4 | 235 |
| PAAEPII.OKCL MCF 34 | 39 | 17 | 1.1 | 1.1 | 173 |
| PAAPAGI.OK MCF 14 | 39 | 17 | 1.3 | 1.3 | 272 |
| PAAPAGI.OK MCF 18 | 39 | 17 | 1.2 | 1.2 | 253 |
| PAAPAGI.OK MCF 22 | 39 | 17 | 1.1 | 1.1 | 214 |

The surface area, cell diameter, window and pore volume of MCF and the amine polymer-loaded MCF samples were investigated by nitrogen adsorption/desorption isotherms. The textural properties of MCF and all the composite samples prepared in this work are summarized in Table 2. All samples exhibit type IV isotherms according to the IUPAC classification. The isotherms demonstrate a significant reduction in total pore volume and surface area with composites containing different polymer percentages. The BET surface area, cell diameter, and window and pore volumes of the bare MCF are 660 $m^2/g$, 39 nm, 17 nm and 2.7 $cm^3/g$, respectively. The surface area and pore volume of the composites decrease significantly with increasing polymer loadings. The polymer may be largely contained within the pores, although some part of it could be also outside the pores on the external surface. It appears there is less porosity loss when loading higher molecular weight and linear polymers compared to branched polymers, which is consistent with increased difficulty in all of these polymers into the pores of the support. Together with the TGA results, the data confirm that the amine polymers are loaded into the pore channels of the MCF support.

TABLE 3

Capacity and amine efficiency in 10% $CO_2$ of synthesized samples.

| Sample ID | Amine loading (mmol N/g) | Capacity (mmol C02/g sorbent) | Amine efficiency (mol C02/mol N) |
|---|---|---|---|
| PEI0.8KBR MCF 25 | 6.49 | 1.21 | 0.19 |
| PEI0.8KBR MCF 35 | 8.96 | 1.83 | 0.20 |
| PEI0.8KBR MCF 45 | 10.71 | 2.40 | 0.22 |
| PEI2.5KLN MCF 25 | 5.07 | 0.57 | 0.11 |
| PEI2.5KLN MCF 35 | 9.05 | 1.35 | 0.15 |
| PEI2.5KLN MCF 45 | 10.62 | 1.69 | 0.16 |
| PAA1.4KLN MCF 25 | 5.74 | 1.35 | 0.24 |
| PAA1.4KLN MCF 35 | 7.24 | 1.56 | 0.22 |
| PAA1.4KLN MCF 45 | 9.51 | 1.36 | 0.14 |
| PAAEPII.OKCL MCF 20 | 3.46 | 0.98 | 0.28 |
| PAAEPII.OKCL MCF 27 | 4.68 | 1.65 | 0.35 |
| PAAEPII.OKCL MCF 34 | 5.20 | 1.76 | 0.34 |
| PAAPAGI.OK MCF 14 | 2.77 | 0.94 | 0.34 |
| PAAPAGI.OK MCF 18 | 3.68 | 1.31 | 0.36 |
| PAAPAGI.OK MCF 22 | 4.39 | 1.77 | 0.40 |

TABLE 4

Capacity and amine efficiency in 400 ppm $CO_2$ of synthesized samples.

| Sample ID | Amine loading (mmol N/g) | Capacity (mmol C02/g sorbent) | Amine efficiency (mol C02/mol N) |
|---|---|---|---|
| PEI0.8KBR MCF 25 | 6.49 | 0.61 | 0.09 |
| PEI0.8KBR MCF 35 | 8.96 | 1.08 | 0.12 |
| PEI0.8KBR MCF 45 | 10.71 | 1.74 | 0.16 |
| PEI2.5KLN MCF 25 | 5.07 | 0.14 | 0.03 |
| PEI2.5KLN MCF 35 | 9.05 | 0.75 | 0.08 |
| PEI2.5KLN MCF 45 | 10.62 | 0.57 | 0.05 |
| PAA1.4KLN MCF 25 | 5.74 | 0.63 | 0.11 |
| PAA1.4KLN MCF 35 | 7.24 | 0.86 | 0.12 |
| PAA1.4KLN MCF 45 | 9.51 | 0.84 | 0.09 |
| PAAEPII.OKCL MCF 20 | 3.46 | 0.47 | 0.14 |
| PAAEPII.OKCL MCF 27 | 4.68 | 0.85 | 0.18 |
| PAAEPII.OKCL MCF 34 | 5.20 | 0.83 | 0.16 |
| PAAPAGI.OK MCF 14 | 2.77 | 0.43 | 0.16 |
| PAAPAGI OK MCF 18 | 3.68 | 0.57 | 0.15 |
| PAAPAGI.OK MCF 22 | 4.39 | 0.98 | 0.22 |

The maximum amine efficiency for $CO_2$ capture under dry conditions for the branched PEI can be calculated assuming that only primary and secondary amines capture $CO_2$ under dry conditions, and that two amines are required to bind one molecule of $CO_2$. Under such conditions, that maximum theoretical amine efficiency is 0.385 (77% primary and secondary amines). For air capture conditions, i.e., containing 400 ppm $CO_2$, it is expected that only primary amines can capture $CO_2$, making the maximum theoretical amine efficiency 0.22 (44% primary amines). In 10% $CO_2$, the maximum theoretical amine efficiency for PEI linear is 0.50 (100% primary and secondary amine) and at 400 ppm is 0.02 (3.45% primary amines based on an average of 58 repeat units of Mw 2500 Da.). For PAA linear, which contains all primary amines, the maximum theoretical amine efficiencies are 0.50 for both $CO_2$ concentrations. The calculation of the maximum theoretical amine efficiency for PAAEPI is based on a molar ratio of PAA:EPI (20:1). At 10% and 400 ppm $CO_2$, the maximum theoretical amine efficiencies are 0.50 (100% primary and secondary amines) and 0.45 (90% primary amines), respectively. The calculation of the maximum theoretical amine efficiency for PAAPAG is based on molar ratio of PAA:PC (6.4:1). In 10% $CO_2$, the maximum theoretical amine efficiency is 0.50 (100% primary and secondary amines) and it is 0.455 (only primary amines; other N atoms in PAG group do not adsorb $CO_2$) in 400 ppm.

The $CO_2$ adsorption capacity increased for both the PEI branched and PEI linear samples, as the PEI loading was increased. Samples with higher PEI content were allowed for larger $CO_2$ capacities with a roughly linear relationship between capacity and polymer loading, suggesting that the amines are all accessible in these composite samples. The porosity data presented in Table 2 are consistent with this supposition. It is noteworthy that PEI branched yielded a higher adsorption capacity than the PEI linear. For PAA linear, a $CO_2$ sorption capacity of 1.35 and 1.56 mmol $CO_2$/g sorbent was measured for 25 and 35 wt % loading samples, respectively. The $CO_2$ sorption capacity decreased as the PAA loading was increased to 45 wt % (1.36 mmol $CO_2$/g sorbent). As noted above, we hypothesize that the branched polymers more easily access the pores of the support and that higher molecular weight polymers are more likely to have difficulty in accessing the support pores, with a larger polymer fraction being present on the polymer surface, possibly forming a barrier layer that presents access to amine sites in the center of the composite sorbents. FIG. 16 presents the amine efficiency of PEI branched, PEI linear and PAA linear composites, which show the utilization and accessibility of the amine sites in each composite material. The amine efficiency of the PAA linear sorbents decreased as the organic loading increased above 35% organic loading.

FIG. 15 presents a comparison of the $CO_2$ capture performance using 10% $CO_2$ over PEI branched, PEI linear and PAA linear loaded MCF materials with different polymer loadings. For PEI branched, the adsorption capacity at 25, 35 and 45 wt % loading were 1.21, 1.83 and 2.40 mmol $CO_2$/g sorbent, respectively. At the same loading, the $CO_2$ sorption capacities of PEI linear were 0.57, 1.35 and 1.69 mmol $CO_2$/g sorbent, respectively.

The structure of the PAA was altered by cross-linking with epichlorohydrin or the guanidinylation of PAA to introduce guanidinyl groups into the polymer, producing PAAEPI and PAAPAG, respectively. FIG. 17 and FIG. 18 present a comparison of the $CO_2$ capture performance and amine efficiency using a 400 ppm $CO_2$ gas stream as a function of the polymer type (PEI branched, PEI linear and PAA linear) and loading in the MFC support. The adsorption capacity and efficiency of PEI branched increased with increasing loading. Again, as discussed above, the decreased efficiencies are likely associated with amine accessibility, which is impacted by polymer branching and molecular weight. It should be noted that the order of the utility of the adsorbents is different in comparing results using 10% $CO_2$ vs. 400 ppm $CO_2$. At flue gas conditions, the PEI branched was the most efficient and had the highest capacity, followed by PEI linear and PAA linear. In contrast, the order was PEI branched, then PAA linear, followed by PEI linear. This is because PEI linear only has primary amines at the two chain ends and thus there are fewer primary amines in this sample compared to the other two polymers tested. At the lowest polymer loading, the PAA linear is actually more efficient than the PEI branched under 400 ppm conditions, consistent with the hypothesis that primary amines are needed for efficient capture of $CO_2$ from ultra-dilute gas streams.

FIGS. 7, 8, 9 and 10 present a comparison of the $CO_2$ capture performance and amine efficiency using a 400 ppm $CO_2$ gas stream (equivalent to ambient air) and a 10% $CO_2$ gas stream (equivalent to a PAAEPI-loaded MCF at different organic loadings. The adsorption capacity for PAAEPI, for gas containing 10% $CO_2$, increased up to at least 35% organic loading, although the efficiency declined at above 25% loading. efficiency of PEI branched increased with increasing loading. The data resulting from the same tests using PAAPAG in place of PAAEPI are charted on FIGS. 11-14.

The collected data show that the poly(allylamine) polymers show promise as adsorbents for $CO_2$ capture from multiple $CO_2$-containing gas streams, but especially from ultra-dilute streams such as those simulating ambient air. PAA polymers and modified PAA polymers can be used to allow for comparable or enhanced $CO_2$ capacities and amine efficiencies relative to the state-of-the-art polymer, PEI. Comparisons of data showing the organic loading and the $CO_2$ adsorption capacities of the several tested adsorbents in MCF are set forth in FIGS. 15 through 18, at 10% $CO_2$ (about 5% O.sub.2 and 400 ppm $CO_2$, about 20% $CO_2$.

When considering the effect of lower efficiency on the part of the poly(allylamine) materials, it must be remembered that these products have far greater oxidative resistance than PEI linear or PEI branched, so that after the first few exposures to oxygen in the $CO_2$ adsorption station following regeneration of the adsorbent, the level of effective PEI is likely to be greatly reduced, especially when treating ambient air, which contains over 20% oxygen, or other gas mixtures containing more than 10% oxygen, and especially mixtures containing at least 15% oxygen. Such gas mixtures are obtained when admixing ambient air with, e.g., flue gas effluent.

Results and Discussion Regarding Amine Polymer Loaded Mesoporous Alumina Materials Analysis using wide angle X-ray diffraction showed an XRD pattern that confirmed the γ-alumina structure of the synthesized alumina. The mesoporous structure of the synthesized alumina was confirmed by nitrogen physisorption measurements. Nitrogen adsorption-desorption isotherms for the alumina were determined and the corresponding pore size distributions calculated by the Broekhoff-de Boer method with Frenkel-Halsey-Hill modification (BdB-FHH) method.

The synthesized γ-gamma.-alumina exhibited a typical type IV isotherm which showed a type HI hysteresis loop, having sharp uptakes at P/Po=0.8-0.9, which indicated the synthesized gamma.-alumina contains well-defined, large mesopores, having diameters averaging in the range of 15-20 nm.

The BET surface area of the synthesized alumina was found to be 223 $m^2/g$ while the pore volume (at P/PO=0.99) was shown to be 1.19 $cm^3/g$. The average mesopore diameter of the synthesized alumina was calculated to be 17.3 nm. On the synthesized alumina support, the aminopolymers, PAA and PEI were impregnated via wet impregnation using methanol as the solvent at room temperature. The organic loadings for all the synthesized adsorbent materials were kept close to 40% by weight.

The Effect of Exposure to Oxidative Conditions

The impregnated PEI and PAA based adsorbents were subjected to oxidizing conditions in flowing oxygen in a fixed bed reactor. The $CO_2$ uptake for the fresh samples and those oxidized under humid conditions are shown in Table 5. In the case of the PEI/alumina adsorbents, as was the case using the MCF supports, the $CO_2$ uptake capacity was reduced drastically by about 70% when the adsorbent was treated under a humid flow of 21% oxygen at 110° C. for 20 h (ALPEI_21_110; from 1.87 mmol/g to 0.56 mmol/g). For samples treated at the lower oxidation temperature (70° C.) with 21% oxygen flowing under humid conditions, the capacity of the oxidized adsorbent (ALPEI._21_70) decreased by ~35% to 1.24 mmol/g. There was considerably less oxidative degradation for the PEI adsorbents, as evidenced by the measured $CO_2$ adsorption capacities, when the oxidation was carried out at the much lower oxygen concentration of 5% under humid conditions. However, at 10% oxygen level there will be extensive oxidation of the PEI materials. The $CO_2$ adsorption capacity for the oxidized sample was found to be 1.73 mmol/g when the oxidation was performed at 110° C. for 20 h in 5% $O_2$ gas (ALPEI_5_110). This was a reduction of only 7.5% relative to the fresh, non-oxidized PEI impregnated adsorbent. At the same $O_2$ concentration of 5% but at the lower temperatures of 70° C., it was observed that no reduction in $CO_2$ capture capacity occurred after oxidation (ALPEI_5_70).

TABLE 5

Oxidation of PEI and PPA impregnated alumina adsorbents under humid conditions and $CO_2$ adsorption behavior

| | | | Oxidation Parameters | | | |
|---|---|---|---|---|---|---|
| Amine polymer | Impregnated Sorbent | Organic loading (wt %) | $O_2$ conc. (%) | Temperature of oxidation (C) | Time on stream (h) | CO2 capacity (mnK, 1C(h/g)[a] |
| PEI | ALPEI fresh | 41.6 | — | — | — | 1.87 |
| PAA | ALPAA fresh | 45.8 | — | — | — | 1.07 |
| PEI | ALPEI_21_110 | 39.0 | 21 | 110 | | 056 (−70.1%) |
| PEI | ALPEI_21_70 | 41 7 | 21 | 70 | 20 | 1.24 (−33.4%) |
| PEI | AL.PEI_5_110 | 41.4 | 5 | 110 | 20 | 1.73 (−7.5%) |
| PEI | ALPEI_5_70 | 40.0 | 5 | 70 | 20 | 1.86 (−1.4%) |
| PAA | ALAA_21_110 | 44.4 | 21 | 1.10 | 20 | 0.96 (−10.9%) |
| PAA | ALPAA_21_70 | 45.3 | 21 | 70 | :W | 1.0 (−7.-%) |
| PAA | ALPAA_5_10 | 42.0 | 5 | 110 | 10 | 0.94 (−12.0%) |
| PAA | ALPAA_5_70 | 44.8 | 5 | 70 | 20 | 0.98 (−9.0%) |

[a]The parenthetic values are percentage change from the fresh sample.

Based on the above results, it can be inferred that at the oxygen concentration typical of flue gas from the coal-fired power plants (5%), under humid conditions, PEI/alumina sorbents demonstrate good stability over the temperature range studied (<110° C.), with only a modest loss in CO2 uptake at 110° C. (ALPEI_5_110). However, at higher $O_2$ concentration, i.e., of around 20%, akin to what is found in ambient air, the PEI-based sorbents were degraded substantially at both temperatures. Similar substantial oxidation occurs when treating a flue gas/ambient air mixture containing above about 10% oxygen with a PEI adsorbent.

The dramatic decrease in $CO_2$ uptake for the oxidized sample can be attributed to the loss of amino functionalities during oxidation. This was corroborated by the FTIR spectra of the fresh and oxidized PEI/alumina adsorbents.

The FTIR spectrum of most oxidized PEI/alumina sorbent (AlPEI_20_110) also exhibits NH and $NH_2$ bands at 1620 $cm^{-1}$ as well as $CH_2$ bands at 2985 and 2889 $cm^{-1}$. However, there are other significant changes in the spectrum as compared to that of fresh sample. A new characteristic band at 1693 $cm^{-1}$ assigned to the carbonyl (C═O) stretching frequency from an amide, acid or imide, a product of amine oxidation, was clearly observed indicating the oxidation of amines in AlPEI_20_110 to create nitrogen containing groups with lower basicity, and hence lower affinity for acidic $CO_2$. The oxidation of amines in the PEI/alumina sorbent was also observed in the complimentary FT-Raman spectra obtained before and after oxidation.

The FT-Raman spectrum of fresh PEI/alumina sorbent exhibits an intense band at 1477 $cm^{-1}$ that is clearly attributed to $CH_2$ bending. Other bands appearing at 1319, 1124, and 1064 $cm^{-1}$ can also be attributed to the wagging and twisting motions associated with the methylene group.[59] The oxidized ALPEI_21_110 also exhibits the $CH_2$ bands at 1396, 1270 and 1072 $cm^{-1}$. However, there is an additional intense band at 1691 $cm^{-1}$ characteristic of the carbonyl stretching frequency in the FT-Raman spectrum of the oxidized sample. This further supports the assignment of amide, imide or acid oxidation products made from the FTIR spectra discussed above, which is consistent with the literature data on PEI and amine oxidation in class 1 and class 2 amine adsorbents.

Noticeably, significant differences in the oxidation patterns were observed for the PAA impregnated sorbents in comparison to the PEI sorbents. Unlike the sorbents made using branched PEI, which contains primary, secondary and tertiary amines, the poly(allylamine) containing sorbents have only primary amines. PAA is more stable than PEI, especially under higher oxygen levels above 10%, so that the advantage of PEI at the beginning of a lengthy duty session consisting of over a hundred adsorption/desorption-regeneration cycles is quickly destroyed; in the overall session the PAA will have the clear advantage. The class 1 PAA samples retained 88% or more of their $CO_2$ capacities, regardless of the treatment conditions (at temperatures of up to 110° C.), showing excellent overall stability.

The most oxidized ALPAA_21_110 showed a reduction of just 10% even after oxidation under the harshest conditions used in this study, 21% $O_2$ and 110° C. This is a dramatically smaller capacity reduction than was observed for the corresponding PEI adsorbent ALPEI_21_110, which showed a loss of almost 70% after oxidation under similar conditions. At the lower temperature of 70° C., the loss of $CO_2$ uptake for the PAA impregnated ALPAA_21_70 was even lower, ca. 7.5% compared to the fresh sample. Meanwhile under similar conditions, the PEI impregnated ALPEI_21_70 showed almost five times greater loss (34%) in $CO_2$ uptake compared to the fresh sample. After only a very few cycles, the PEI-containing substrates will have a far greater effectiveness.

The improved stability of PAA based sorbents towards oxidation was corroborated by FTIR, FT-Raman and $^{13}C$-CPMAS spectroscopic analysis on the fresh as well as oxidized PAA sorbent samples. In the FTIR spectrum of the fresh PAA/alumina sorbent material, the $NH_2$ bands appeared at 1594 $cm^{-1}$ and the bands for $CH_2$ stretching and bending modes appeared at 2931, 2887 and 1495 $cm^{-1}$. The corresponding bands in the most oxidized ALPAA_21_110 are observed at 1604 $cm^{-1}$ for $NH_2$ and 2947, 2879 and 1471 $cm^{-1}$ for the $CH_2$ groups in the amine polymer. The band corresponding to a carbonyl group, as found in the oxidized PEI sample, was not observed in the oxidized PAA adsorbent samples. Similarly in the FT-Raman spectra of both the oxidized and the fresh PAA samples, identical peaks complementing the FTIR spectra were observed for both the samples. Again there was no peak associated with the oxidation (carbonyl formation) of amines in the oxidized ALPAA_21_110 sample. This is in contrast to the PEI oxidized sample ALPEI_21_wherein the carbonyl (C═O) peak was clearly observed.

From the C-CPMAS NMR spectra of the fresh and oxidized sample, ALPAA_21_110 are essentially identical. The broad multiplet signal in the 20-65 ppm region for both the fresh and the oxidized ALPAA_21_110 can be assigned to the carbons (—$CH_2$— and —CH—) of the PAA polymer. The peak at 165.15 ppm observed in the spectrum of both the fresh and oxidized sorbents is from CO2 adsorption from the ambient air. No additional peaks for carbonyl species corresponding to amides, imides, acids, or other oxygen-containing species were observed, again supporting the improved stability of PAA based sorbents towards oxidation. Thus, the slightly reduced $CO_2$ capacities after the thermal treatments are likely not associated with PAA oxidation, but may instead be associated with thermal degradation effects or polymer restructuring in the composite adsorbent.

The collected spectra clearly support the conclusion that the primary-amine rich PAA samples have better oxidative stability than the corresponding sorbents based on PEI, especially at higher temperatures and $O_2$ concentrations. This effect occurs for the branched PEI impregnated class I sorbents, as well as for the linear PEI, on silica substrate and on alumina substrate. However, it is noted that the nature of the substrate can have an effect on adsorption with class I sorbents.

Although the above tests and preparations deal with particulate or granular substrates, the same effects would be found with monolithic Cordierite substrates such are sold by Corning for mesoporous silica substrates and the alumina monoliths as prepared, for example, by Hartmann et al in Materials 2012, 5, 336-349; doi:10.3390/ma5020336, "Challenges and Strategies in the Synthesis of Mesoporous Alumina Powders and Hierarchical Alumina Monoliths."

As described by Hartmann et al, alumina monolith, with hierarchical porosity featuring macro- and mesoporous alumina in monolithic shape, is a very promising material for in flow applications; an optimized synthesis is described for such material. These authors suggest that the easiest and the most reproducible synthesis to produce mesoporous alumina with the desired properties is via a modified synthesis pathway based on the preparation given by Tokudome and Nakanishi, in "Structural Characterization of Hierarchically Porous Alumina Aerogel and Xerogel Monoliths". J. Colloid Interface Sci. 2009, 338, 506-513. Tokudome and Nakanishi employ A1Cl3.6H2O as precursor. PEO (0.08 g) was first dissolved in 5.5 mL Ethanol and 4.0 mL H2O (58:42 v/v EtOH/H2O) at 0° C. Only after complete dissolution of PEO, 4.32 g A1Cl3.6H2O was added under vigorous stirring at 0° C. For complete dissolution of the aluminum salt, the reaction mixture was then maintained at 25° in an oil-bath and 3.8 mL propylene oxide (PO) was quickly added. Within 3 minutes the pH of the sol raised from 1 to 3 and the sol was transferred to vessels. The vessels were sealed and the system was allowed to gel and age at 40° C. for 2 days. After 20 min at 40° C., the sol-gel transition as well as a macroscopic phase separation could be observed, resulting in turbid gel bodies.

After aging, all gels were washed in 2-propanol at 60° C. (4× solvent exchange within 6 h) before they were slowly dried from RT to 40° C. within 7 days. The monoliths were calcined from RT to 500° C. with intermediate heating plateaus at 100°. and 250° C. Each temperature was held for 5 hand the heating ramp between the plateaus was 1° C. min-1.

These monoliths are treated with poly(allylamine) and poly(ethyleneamine) sorbents so as to support the sorbents in their pores, and tested as described above. The results reflect the same oxidative stability of the poly(allylamine) as compared with the poly(ethyleneamine) especially when the adsorption of $CO_2$ occurs from a gas mixture containing at least 10% O2, and is most found for gas mixtures containing at least 15% $O_2$.

CONCLUSIONS

The oxidative stability of PAA/silica and PAA/alumina supported class I adsorbents used for $CO_2$ capture was studied and compared with the supported PEI sorbents. The secondary amine rich PEI based sorbents were found to be less stable than the primary amine containing PAA adsorbents under elevated temperatures and high $O_2$ concentrations, especially during humid oxidation. The PAA based samples showed good stability under all the conditions tested, most significantly when treating ambient air, never losing more than 10% of their $CO_2$ adsorption capacity after thermal oxidative treatments. Similar advantages are shown for mixtures of ambient air with, for example, flue gas, to form a gas mixture containing at least 10% oxygen.

Analysis of the oxidized samples via FTIR, FT-Raman, and C CPMAS NMR spectroscopies clearly demonstrate the formation of carbonyl moieties in the oxidized PEI sample, whereas no significant changes were observed in any of the spectra of the oxidized PAA samples. The formation of carbonyl species is consistent with the deactivation of the amines in PEI to form amides, acids or imides, all of which would reduce the basicity of the nitrogen species in the polymer. The compiled data suggest that primary amine rich PAA polymers are especially suited for the adsorption of $CO_2$ from ambient air, and gas mixtures containing at least 10%, and especially containing at least 15% $O_2$, when supported on porous alumina or silica monolith or granulated forms of such material.

With the foregoing disclosure in mind, it is believed that various other ways of preparing suitable adsorbents for removing carbon dioxide from a gaseous mixture, in accordance with the principles of this application, will become apparent to those skilled in the art, including the use of many conventional steps and components that are or shall become well-known and would be useful in carrying out the present invention without themselves being a part of the invention. The scope of this invention is to be determined only in accordance with the scope of the invention as defined in the following claims.

The invention claimed is:

1. A supported adsorbent comprising a porous substrate on and in which is infused an active adsorbent for $CO_2$ selected from the group consisting of poly(allylamine), cross-linked poly(allylamine) with epichlorhydrin and guanidinylated poly(allylamine), wherein the porous substrate is silica mesocellular foam in monolithic shape.

2. The supported adsorbent of claim 1, wherein the active adsorbent has a weight average molecular weight of not greater than about 5000 Daltons.

3. The supported adsorbent of claim 1, wherein the active adsorbent is poly(allylamine), having a weight average molecular weight of not greater than about 3000 Daltons.

4. The supported adsorbent of claim 1, wherein the active adsorbent is the cross-linked poly(allylamine) with epichlorhydrin which comprises a cross-linked poly(allylamine) cross-linked with epichlorhydrin.

5. The supported adsorbent of claim 1, wherein the weight average molecular weight of the active adsorbent, is in the range of from about 500 to about 2200 Daltons.

* * * * *